(12) United States Patent
Lameres et al.

(10) Patent No.: US 11,966,284 B1
(45) Date of Patent: Apr. 23, 2024

(54) FAULT-TOLERANT COMPUTER FOR RECONFIGURABLE HARDWARE DEVICES

(71) Applicants: MONTANA STATE UNIVERSITY, Bozeman, MT (US); RESILIENT COMPUTING, LLC, Bozeman, MT (US)

(72) Inventors: Brock J. Lameres, Bozeman, MT (US); Christopher Michel Major, Bozeman, MT (US)

(73) Assignees: MONTANA STATE UNIVERSITY, Bozeman, MT (US); RESILIENT COMPUTING, LLC, Bozeman, MT (US)

(*) Notice: Subject to any disclaimer, the term of this patent is extended or adjusted under 35 U.S.C. 154(b) by 0 days.

(21) Appl. No.: 18/484,106

(22) Filed: Oct. 10, 2023

(51) Int. Cl.
  *G06F 11/07* (2006.01)
  *G06F 11/16* (2006.01)
  *G06F 11/30* (2006.01)

(52) U.S. Cl.
  CPC ...... *G06F 11/0793* (2013.01); *G06F 11/0721* (2013.01); *G06F 11/16* (2013.01); *G06F 11/3024* (2013.01)

(58) Field of Classification Search
  CPC .. G06F 11/0721; G06F 11/183; G06F 11/184; G06F 11/187; G06F 11/202; G06F 11/3024; G06F 11/0751; G06F 11/16
  See application file for complete search history.

(56) References Cited

U.S. PATENT DOCUMENTS

| | | | |
|---|---|---|---|
| 7,237,148 B2 | 6/2007 | Czajkowski et al. | |
| 8,738,860 B1* | 5/2014 | Griffin | G06F 12/0897 711/122 |
| 2004/0199813 A1* | 10/2004 | Hillman | G06F 11/181 714/13 |
| 2005/0005203 A1 | 1/2005 | Czajkowski | |

(Continued)

OTHER PUBLICATIONS

Major, C. M. et al., "RadPC: A Novel Single-Event Upset Mitigation Strategy for Field Programmable Gate Array-Based Space Computing," Journal of Aerospace Information Systems ( IF 1.5 ) , Pub date: Apr. 2, 2021; https://doi.org/10.2514/1.1010859.

(Continued)

*Primary Examiner* — Yolanda L Wilson
(74) *Attorney, Agent, or Firm* — THE MARBURY LAW GROUP PLLC

(57) ABSTRACT

A fault-tolerant computer system includes a plurality of processors configured to simultaneously execute identical sets of processor-executable instructions, each of the plurality of processors containing a processor core including one or more registers and a local memory, an arbiter configured to read each of the registers of the plurality of processors, detect incorrect register values, and overwrite the registers containing the incorrect register values with corrected register values, and a memory scrubber configured to read each address of the local memories of the plurality of processors, detect incorrect memory values, and overwrite addresses containing the incorrect memory values with corrected memory values. In various embodiments, the computer system may be implemented using one or more field programmable gate arrays (FPGAs).

20 Claims, 24 Drawing Sheets

(56) References Cited

U.S. PATENT DOCUMENTS

| | | | |
|---|---|---|---|
| 2006/0129897 A1* | 6/2006 | Gomyo | G06F 11/0781 |
| | | | 714/49 |
| 2017/0024268 A1* | 1/2017 | Kimura | G06F 9/38585 |
| 2019/0287607 A1* | 9/2019 | Koladi | G11C 29/52 |

OTHER PUBLICATIONS

Major, Chris Michel, "Novel Approach to Fault Tolerance in Space Computers Leveraging the Risc-V Architecture," Ph.D dissertation orally presented at Montana State University, Bozeman, Montana, in May 2023 (publication not available to the public as of Oct. 10, 2023).

* cited by examiner

US 11,966,284 B1

FAULT-TOLERANT COMPUTER FOR RECONFIGURABLE HARDWARE DEVICES

GOVERNMENT SUPPORT

This invention was made with Government support under Contract No. 80MSFC20C0032 awarded by the National Aeronautics and Space Administration (NASA), and under Contract Nos. 80NSSC21C0074, 80NSSC22PB173, and 80NSSC23CA147 awarded by the National Aeronautics and Space Administration Small Business Innovation and Research program (NASA SBIR). The Government has certain rights in the invention.

FIELD

The present disclosure relates generally to fault tolerant computing and processor technology for aerospace and other applications.

BACKGROUND

Space exploration, as an industry, has grown rapidly over the past decade in part due to increasing interest and investment from the private sector. With increased demand for space exploration comes increased demand for aerospace hardware that can safely carry humans and equipment deep into space. There is a continuing need to improve the reliability and performance of computer systems used for space-based and other high-radiation environment applications.

SUMMARY

According to an embodiment of the present disclosure, a fault-tolerant computer system includes a plurality of processors configured to simultaneously execute identical sets of processor-executable instructions, each of the plurality of processors comprising a processor core including one or more registers, and a local memory, an arbiter configured to read each of the registers of the plurality of processors, detect incorrect register values, and overwrite the registers containing incorrect register values with corrected register values, and a memory scrubber configured to read each address of the local memories of the plurality of processors, detect incorrect memory values, and overwrite addresses containing incorrect memory values with corrected memory values.

According to another embodiment of the present disclosure, a method of operating a fault-tolerant computer system comprises simultaneously executing identical sets of processor-executable instructions on a plurality of processors, wherein each of the plurality of processor comprises a processor core comprising one or more registers and a local memory; reading each of the registers of the plurality of processors, detecting incorrect register values, and overwriting the registers containing the incorrect register values with corrected register values; and reading each address of the local memories of the plurality of processors, detecting incorrect memory values, and overwriting addresses containing the incorrect memory values with corrected memory values.

DETAILED DESCRIPTION

Figure 1:
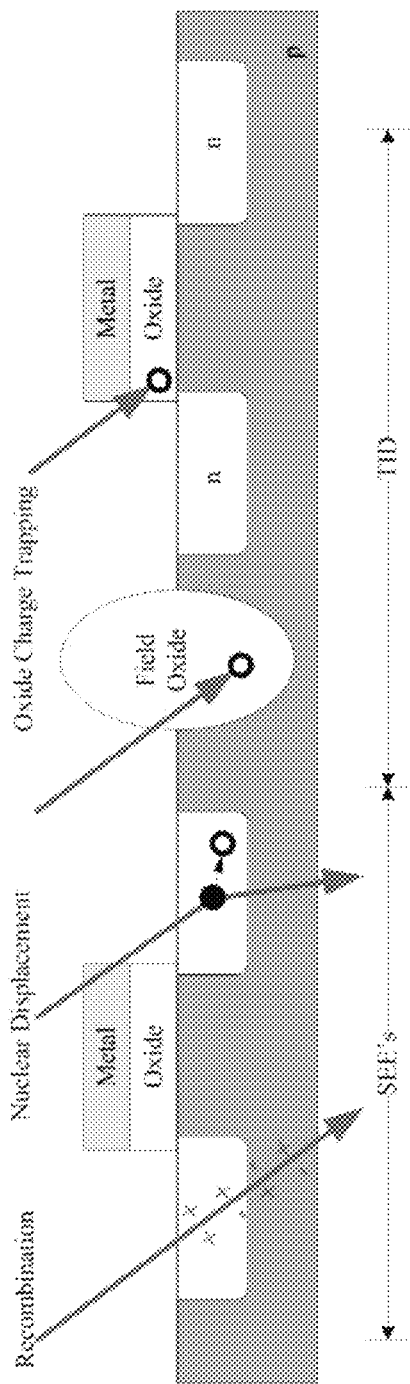
FIG. 1 is a cross-section view of a silicon device structure used in computing systems schematically illustrating total ionizing dose (TID) and single event effect (SEE) radiation-induced failures according to embodiments of the present disclosure.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The present invention can "comprise" (open ended) or "consist essentially of" the components of the present invention as well as other ingredients or elements described herein. As used herein, "comprising" means the elements recited, or their equivalent in structure or function, plus any other element or elements which are not recited. The terms "having" and "including" are also to be construed as open ended unless the context suggests otherwise. As used herein, "consisting essentially of" means that the invention may include ingredients in addition to those recited in the description and/or claim, but only if the additional ingredients do not materially alter the basic and novel characteristics of the claimed invention.

Any and all ranges recited herein include the endpoints, including those that recite a range "between" two values. Terms such as "about," "generally," "substantially," "approximately" and the like are to be construed as modifying a term or value such that it is not an absolute, but does not read on the prior art. Such terms will be defined by the circumstances and the terms that they modify as those terms are understood by those of skill in the art. This includes, at very least, the degree of expected experimental error, technique error and instrument error for a given technique used to measure a value. Unless otherwise indicated, as used herein, "a" and "an" include the plural, such that, e.g., "a medium" can mean at least one medium, as well as a plurality of mediums, i.e., more than one medium.

Where used herein, the term "and/or" when used in a list of two or more items means that any one of the listed characteristics can be present, or any combination of two or more of the listed characteristics can be present. For example, if a composition of the instant invention is described as containing characteristics A, B, and/or C, the composition can contain A feature alone; B alone; C alone; A and B in combination; A and C in combination; B and C in combination; or A, B, and C in combination.

Despite the advancements that have been made in Earth-based computing technology over the last several decades, the reliability and performance of computers used in space and other high-radiation environments has not increased at a comparable pace. For example, NASA has used the same computer system on its' Mars Rover missions going back to 2005 (i.e., the BAE RAD750 space computing system). This is despite the Mars Opportunity Rover suffering a nearly fatal systems failure in 2009 due to charged particles from a radiation strike causing its' motor controller board to crash. And in 2013, the Curiosity Rover experienced a computer failure that was likely the result of a radiation strike. The aerospace industry has documented extensive cases of radiation-induced failures in commercial spacecraft and classified radiation anomalies in various mission environments.

Space computing systems are susceptible to cosmic radiation and charged particles outside of the Earth's atmosphere and magnetic field. Thus, computing systems used in space generally require some form of error mitigation to continue functioning. Two types of failures can occur, classified as total ionizing doses (TID) and single event effects (SEE). FIG. 1 is a cross-section view of a silicon device structure (e.g., metal oxide semiconductor field effect transistors (MOSFETs) used in computing systems that schematically illustrates these two types of radiation-induced failures.

Referring to FIG. 1, a TID causes material degradation within the computer's silicon through charged particles. In a SEE, deposited charges can cause errors in digital signals and data latching. Older computer hardware demonstrated greater susceptibility to TIDs due to larger process nodes (>65 nm) used to manufacture such chips. As modern digital technology continues to decrease rapidly in size, TID errors have become less of a concern due to small feature sizes in fabrication. For instance, complementary metal—oxide—semiconductor (CMOS) integrated circuits (ICs) manufactured in a 65 nm process node demonstrate TID tolerance levels just above 500 krad, and CMOS ICs in a 28 nm process node can achieve up to 600 krad. As such, commercial off-the-shelf (COTS) components are considered to be acceptable radiation-hardened (i.e., rad-hard) solutions in regards to TIDs.

Conversely, SEEs have become the prevalent concern in modern space hardware, a concern that can be divided into three subcategories. A single event transient (SET) occurs when high-energy particles strike a data line within a circuit and cause a logic-level change. A single event upsets (SEU) is similar in concept but only occurs when high-energy particles strike the surface of a CMOS device, depositing enough charge to prompt an unintended logic-level shift. These logic shifts can then interfere with the functionality of a device, requiring counteracting measures such as system resets or power cycles. At this point, a single event functional interrupt (SEFI) has occurred and must be addressed before eventual system failure is reached.

One approach to mitigating radiation effects is to shield the payload with a boundary material. On Earth, this strategy is a simple and cost-effective means of protecting personnel and equipment from radiation hazards. For instance, using concrete with a tungsten additive as a physical boundary between the radiation source and an observer has been shown to decrease radiation dosage significantly. In space, however, such solutions are immediately infeasible due to the large amounts of mass and volume needed to achieve significant radiation attenuation. Transporting such mass into space drastically increases launch service costs and is infeasible for missions, especially for smaller payloads.

To address these concerns, space hardware engineers typically rely on two types of processes to develop radiation resistance within computers themselves. The integrated circuits (i.e., chips) of computing devices can be radiation-hardened by process (RHBP), where the materials are altered to reduce the amount of charge deposited when struck by radiation. This process does not guarantee invulnerability, but only increased resistance to radiation-induced errors. Due to the specific and non-standard manufacturing processes required to create these chips, coupled with the limited market demand in the aerospace sector, fabrication and design of RHBP hardware is incredibly expensive and often cost-prohibitive.

Radiation resistance in systems can also be increased through the design of the circuit layout itself, a technique known as radiation-hardening by design (RHBD). Creating charge channels and guard rings to reroute extra charge deposits due to radiation strikes can increase a computer's ability to survive faults and prevent system damage. Supporting circuits may also be designed and implemented to handle charge deposits and current pulses in storage devices, driving them away from the transistor gates to prevent disrupted operation.

These techniques are often paired with RHBP for maximum resistance, but unfortunately, cannot guarantee invulnerability. Additional bare-silicon features must be manufactured to take advantage of these hardening strategies, increasing costs, labor, and design complexity. Regardless, as demonstrated with the Curiosity Rover case study, such systems will eventually lead to a failure state given enough time, component wear, and excessive charge deposits.

While circuit hardening techniques (i.e., RHBP and RHBD) take the approach of preventing faults, another strategy focuses on making systems resilient, or able to recover from faults that have occurred. Such techniques are referred to as built-in soft error resilience (BISER) and implement discrete redundancy checking to prevent error propagation. These techniques implement checking mechanisms between redundant latches and flip-flops to ensure data integrity and correct errors as they occur. Memory cell implementations of these resilience solutions seek to provide error mitigation and protect their contents from upsets. These solutions have proven to be just as effective in some environments as RHBP and RHBD techniques but, when implemented on a transistor level, significantly increase the design complexity and power consumption of the device. Regardless, the premise of resilience through redundancy checking may demonstrate greater effectiveness than radiation hardening processes.

Figure 2:
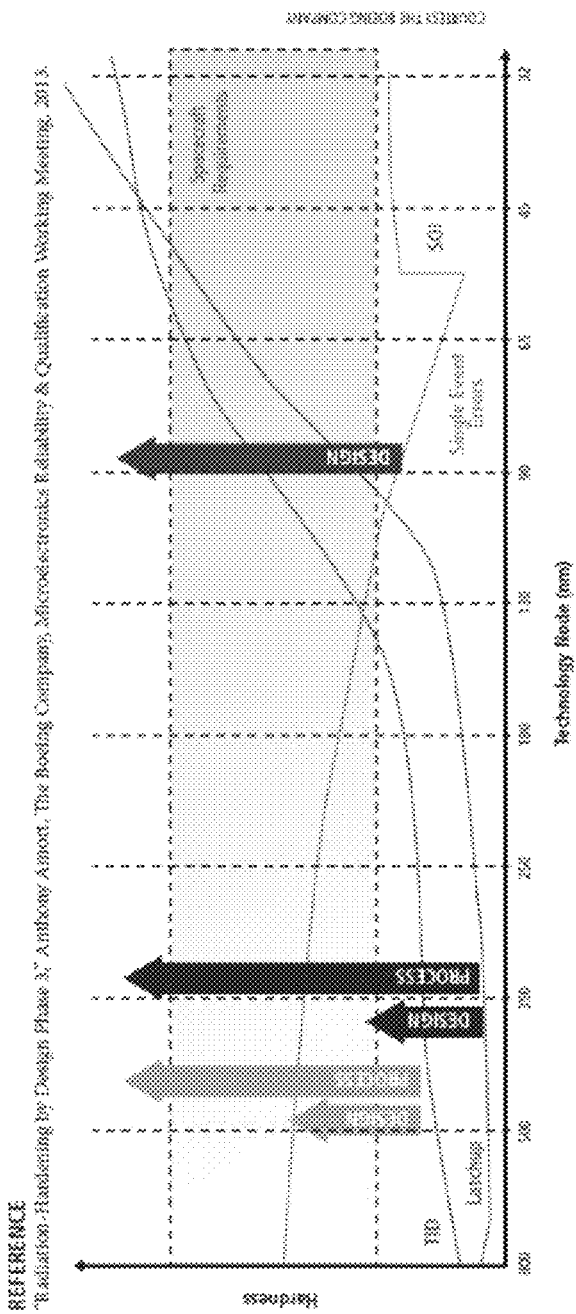
FIG. 2 is a plot illustrating the radiation hardness of integrated circuits (ICs) as a function of processing node size.

Even as RHBP/RHBD devices mitigate the effects of heavy ions, the issue of radiation-induced faults still persists. Within smaller process nodes, 28 nm for example, the risk of SEEs compromising the system increases, while TIDs become far less of a concern. This trend is illustrated in FIG. 2, which is a plot illustrating the radiation hardness of ICs as a function of processing node size. As shown in FIG. 2, as the processing node of an IC decreases in size, hardness against TIDs increases as hardness against SEEs reaches a lower limit. As such, TIDs are considered significantly less of an issue in modern CMOS devices compared to SEEs.

Various embodiments of the present disclosure provide increased reliability and radiation-resistance to computers by implementing a novel approach to adding resilience to computing systems. Given the limitations of radiation hardening methods in protecting space computing systems, methods revolving around radiation resilience demonstrate greater potential in computational reliability. Methods to reduce the effects of SEEs in commercially-available computing devices and components are presented.

In part due to these limitations of radiation-hardened fabrication methods, the speed and performance of IC chips used in the aerospace field may lag the speed and performance of chips used in current-generation commercially-available computers by twenty years or more. Another contributing factor to this relative lag in performance may be due to the principle of "flight heritage," a concept that determines the effectiveness of spaceflight hardware based on the number of successful space exploration missions in which it has previously played a part. Thus, there is often a preference for older using computing platforms that have an extensive "flight heritage," despite their relatively lower speed and performance characteristics.

As outlined in the 2020 NASA Technology Taxonomy (TX02), most current, state-of-the-art flight computers are custom, radiation-hardened single processor systems. Generally, such computers demonstrate performances of 35-400 MIPS (Mega-Instructions Per Second), 10-200 MFLOPS (Mega-Floating Point Operations Per Second), consume power within the 20-30W range, and show power efficiency of around 20 MIPS/W. With upcoming missions increasing in number and complexity of tasks, there is a growing need for flight computers to exhibit greater performance.

Within TX02, the need for computers to surpass performances of 1000+ MIPS and MFLOPS, consume less than 10W of power, and achieve power efficiencies of around 20 MIPS/W are present and in high demand. All of these requirements must be met, however, with radiation resilience and the ability to mitigate faults induced by SEEs.

NASA technology roadmaps demonstrate the need for reliable space computing systems that can survive in harsh radiation environments and support high-speed data processing. Space exploration missions increasingly demand computing systems that can meet these requirements—with even greater importance given the roles of astronauts on manned missions. A fatal radiation strike on an unmanned mission, though devastating, is often limited to remotely operated hardware. A radiation strike on a mission with a human crew, however, could be the determining factor between survival and disaster. Thus, technologies are required that can provide the resilience and performance future space exploration requires.

Other solutions focus on redundant systems to account for errors, utilizing commercial off-the-shelf (COTS) components in spite of susceptibility to radiation. These redundancies are implemented through multiple processors, memory devices, and interface devices, structured so a fault in one system does not leave others compromised. NASA's choice method is triple modular redundancy (TMR), using three redundant systems to perform a task that is overseen by a voting mechanism that detects faulty operations.

The remaining consideration regards the level of redundancy within the system, presenting a trade-off between reliability and resource consumption. For instance, a TMR strategy cannot practically be applied to every component of a design due to limited device space, timing constraints, resource constraints, and other such considerations. The effectiveness of a TMR strategy must balance the limitations of the device area, component usage, and component density. It is practical, then, to triplicate some components and not others—a strategy known as partial TMR. For example, in A. Keller et al., "Partial TMR for improving the soft error reliability of SRAM based FPGA designs," *IEEE Transactions on Nuclear Science* (2021), the authors present a testing methodology that demonstrates the effectiveness of partial TMR strategies, reducing the cross-sectional area of a logic circuit that can be affected by induced faults. In contrast, in A. Wilson et al., "Neutron radiation testing of a TMR VexRiscv soft processor on SRAM-based FPGAs," *IEEE Transactions on Nuclear Science* (2021), the authors demonstrate the effectiveness of complete TMR across every sub-component of a RISC-V processor in the mitigation of errors induced by faults.

Such technologies, however, only delay inevitable failure from accumulated radiation faults. While a system may continue operations for an extended period, the inability to reverse the damage of an induced fault renders a failure state to be inevitable. A. Perez et al., "Identifying radiation-induced micro-SEFIs in SRAM FPGAs." *IEEE Transactions on Nuclear Science* 68 (2021) further this realization by presenting an experiment demonstrating the effects of micro-SEFIs, a subclass of SEUs that causes interrupts in a digital system by flipping multiple bits in a given area of impact. Such interrupts, given the right area of the digital logic, can compromise the redundancies of a TMR mechanism and render the entire voting mechanism useless. As such, TMR in isolation is an inadequate method of error mitigation.

One COTS technology, however, demonstrates the ability to repair faulted areas. Field programmable gate arrays (FPGAs) are digital logic devices that can be configured into any desired computational architecture. They are a well-established technology with COTS availability, competitive pricing, and extensively-supported design and development environments—as opposed to the limiting supply constraints of conventional RHBP/RHBD systems. An FPGA can implement a computing system with extra features not available with commercial microcontrollers, including error-checking mechanisms for computational performance. Nils-Johan Wessman et al., "De-RISC" the first RISC-V space-grade platform for safety-critical systems, 2021 *IEEE Space Computing Conference (SCC)*, pp. 17-26 (2021) describes a System on Chip FPGA configuration that uses error-checking mechanisms within the processor's CPU to detect errors in space environments and make adjustments in software to correct the functionality of the real-time operating system.

FPGAs can also offer performance increases through parallelism. Tasks that require sequential execution by standard microcontrollers can be sped up through parallel hardware, speeding up operations significantly. This idea of hardware acceleration is especially useful in computationally demanding tasks like machine learning, in which neural networks can leverage faster hardware to reduce computation times. Danilo Cappellone et al., "On-board satellite telemetry forecasting with RNN on RISC-V based multicore processor," 2020 *IEEE International Symposium on Defect and Fault Tolerance in VLSI and Nanotechnology Systems (DFT)*, pp. 1-6 (2020) describe an FPGA-based recurrent neural network (RNN) for use in telemetry forecasting in satellites orbiting Earth. To reduce wasted time spent transmitting data and receiving commands, FPGA-based RNNs aim to leverage hardware acceleration and perform such complex calculations quickly. This strategy, however, highlights the need for fault mitigation mechanisms to ensure such logic circuitry is less susceptible to radiation-induced faults.

It can be relatively straightforward to implement logic redundancy on an FPGA by reusing pre-defined modules of logic circuitry. Thus, FPGAs may be used as a means of establishing redundancy for space computing technologies. Most importantly, FPGAs can be reconfigured as needed when any portion of its logic is faulted or affected. This feature, known as Partial Reconfiguration (PR), can be used as a means of self-repair and may be used in aerospace applications as a means of radiation resilience.

A logic circuit may be designed in an FPGA using a hardware description language (HDL) and a dedicated synthesis tool to convert the described circuitry into real-time logic (RTL) that the FPGA can run. Popular HDLs include VHDL and Verilog. The synthesis tool also allows a developer to configure timing, logic placement and routing, and generate output files (such as bitstreams) to be deployed onto an FPGA during regular operations. Some synthesis tools even allow for live debugging of an FPGA's internal logic.

Thus, redundant logic circuitry using FPGAs may provide effective SEU protection while increasing component accessibility and reducing design complexity. Accompanying this strategy with reconfiguration techniques may strengthen the ability to flush out faults before they cause extensive damage to a system.

With respect to memory protection strategies, radiation-hardened memory technologies such as ferroelectric random access memory (FRAM), magnetic random-access memory (MRAM), phase change random access memory (PCRAM), and resistive random access memory (ReRAM) have demonstrated potential for computing systems that require increased resistance to SEEs and SEFIs. These technologies have also been developed as a means of enabling further resilience within FPGA devices. Such memory devices, however, are relatively expensive and may have limited commercial availability for larger storage. Though the manufacturing technology will continue to develop and reduce the costs for development, the effects of SEUs within the CMOS technology that links memory to the rest of the logic still prove vulnerability and require resilience mechanisms to ensure successful operation.

Preventative methods for memory contents may include error correction codes (ECCs), which is a method involving tagging data with extra bits to cross-check with the corresponding original value and detect bit flips. This allows a device reading from memory to determine if its contents have been corrupted. If a single bit has flipped, the ECCs may allow for data correction. If the error cannot be corrected, the ECCs may indicate to the rest of the system that further action may be required.

Resolving errors within memory devices may be conducted by iterating through each data cell and checking its value against a reliable source. This method is known as memory scrubbing and is conducted by a scrubber device. If an error is detected, the data can be refreshed with the correct value through a rewrite. The behavior of the scrubber can further be tailored to the device's constraints by scrubbing in selected regions—a strategy known as partial scrubbing. Applying scrubbing to device memory devices and an FPGA's configuration memory can further increase the reliability of the system by ensuring data integrity.

Figure 3:
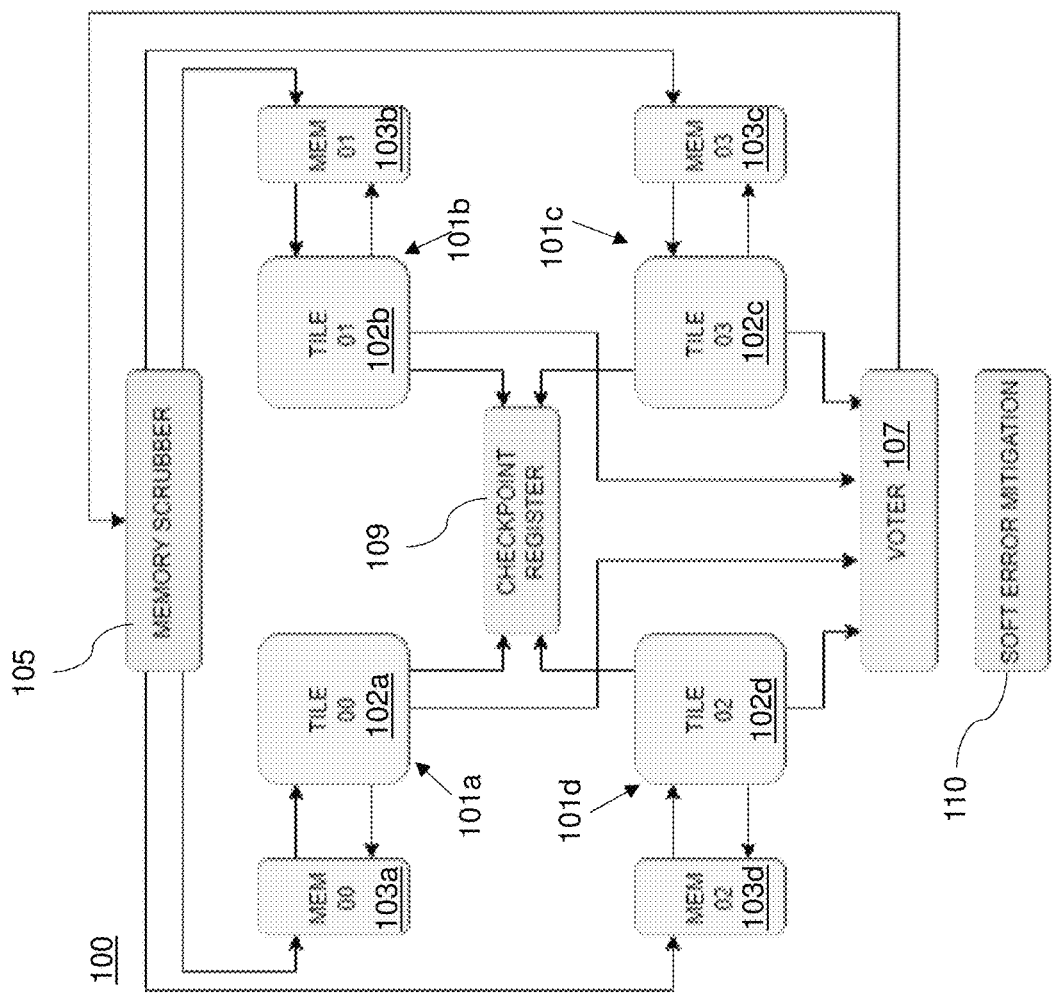
FIG. 3 is a system block diagram schematically illustrating a computer architecture configured to mitigate the effects of radiation in space or other high-radiation environments.

FIG. 3 is a system block diagram schematically illustrating a computer architecture configured to mitigate the effects of radiation in space or other high-radiation environments. Referring to FIG. 3, a computer system 100, which may also be referred to as a "RadPC" system, may use FPGA hardware to run and monitor a single program in parallel on four processors 101*a*, 101*b*, 101*c* and 101*d*. Redundant components are an established means of radiation resilience within the aerospace industry and thus may form the underlying structure of the RadPC architecture. As a means of protecting the redundant processors and resolving soft errors within their operations, dynamic reconfiguration of the FPGA may be utilized.

The computer system 100 shown in FIG. 3 may include four-modular redundancy (4MR) of the processors 101*a*, 101*b*, 101*c* and 101*d* to ensure an operation can continue in the event of an SEU interruption, similar to NASA's TMR design. This partially-redundant design may be coupled with a partial reconfiguration (PR) capability, which is a technique that allows FPGA hardware to be refreshed and clear out any errors that occur within its logic-circuit fabric. Thus, if a processor is damaged, it can be partially reconfigured by the FPGA while the remaining TMR-like processor structure continues program execution. Parallelization within FPGA hardware is advantageous and has been used to develop faster processing systems, efficiently delegating resources to increase performance. While each parallel core within the RadPC system 100 may perform the exact same task, the delegated resources ensure redundancy amidst faults—an SEU that cripples one processor core will not affect the others from completing the current instruction.

It should be noted that the entirety of a processor may not undergo PR in a system 100 as shown in FIG. 3. The central processing unit (CPU) and memory management unit (MMU) may be reconfigured, but the memory devices—local or global—do not undergo PR and may instead be treated by scrubber(s) 105. Thus, the part of each processor 101*a*, 101*b*, 101*c* and 101*d* that can be repaired via PR is called a tile 102*a*, 102*b*, 102*c* and 102*d*. The system 100 shown in FIG. 3 includes four processor tiles 102*a*, 102*b*, 102*c* and 102*d* that can be reconfigured and repaired, while the corresponding local memory devices 103*a*, 103*b*, 103*c* and 103*d* of each processor 101*a*, 101*b*, 101*c* and 101*d* are left alone.

Processor health may be monitored by additional circuitry within the FPGA. A voter circuit 107 and a checkpoint register 109 may monitor the outputs from each processor 101*a*, 101*b*, 101*c* and 101*d* for each software cycle to determine if a fault has occurred, and may then schedule a PR to repair the affected tile 102*a*, 102*b*, 102*c* and 102*d* and resume operations. This is a form of software checkpointing and is used to account for possible drift in processor timing. Data memory is protected from SEUs through use of a memory scrubber 105, another mitigation circuit triggered by the voter circuit 107 in the case of a detected processor fault. The memory scrubber 105 may read the data memory cells 103*a*, 103*b*, 103*c* and 103*d* that are assigned to each processor 101*a*, 101*b*, 101*c* and 101*d*, compare their contents, and rewrite faulty values to match the majority. These elements are overseen by a soft error mitigation (SEM) circuit 110 that monitors the underlying configuration memory of the FPGA and corrects SEUs that threaten the system as a whole. The SEM 110 may be a Xilinx FPGA that serves as a scrubber specifically designed for configuration memory. Other suitable configurations for the SEM circuit 110 are within the contemplated scope of disclosure.

However, a RadPC system 100 such as shown in FIG. 3 may have certain inefficiencies in performance. For example, while the default clocking speed of the system 100 (e.g., 16 MHz) may be comparable to that of a standard COTS microcontroller, its program execution in the context of SEU mitigation may be relatively inefficient. The time required to successfully perform a PR forces runtime lag between the damaged processor 101*a*, 101*b*, 101*c*, 101*d* and its counterparts, which will affect the voter 107 as it waits for each processor to present its program results for the same instruction cycle. As SEUs affect the system and are repaired, this lag reaches a plateau and virtually guarantees a significant time delay between each processor's instruction cycles. That delay threatens the runtime performance of the RadPC system 100 architecture, creating not only inefficiency in program execution but opening large windows of time for SEU strikes to further interrupt operations.

The RadPC system 100 may also utilize a proprietary softcore processor, such as the MicroBlaze processor from Xilinx, Inc. While this component may suffice for purposes proof-of-concept, the blackbox design of the MicroBlaze processor and similar proprietary products prohibits access to its internal components for modification or upgrade. Synchronization of processors must be done with software, leaving multiple instructions' worth of clock cycles primed for further errors that can disrupt performance.

Regardless, a RadPC system 100 such as shown in FIG. 3 has established and continues to establish flight heritage, including missions on high-altitude balloons, sounding rockets, two CubeSats, two International Space Station missions, and an upcoming demonstration on the surface of the moon. However, as each mission has demonstrated and stress-tested another layer of functionality, it has become evident that current SEU mitigation strategies compromise performance. Considering the increased need for high-performance space computing systems, an architecture that can withstand space radiation but lacks speed is inadequate to the needs of the industry.

Softcore processors can be divided into two categories: blackbox and glassbox. A processor such as the above-described Microblaze processor qualifies as a blackbox processor in that all of its internal components are inaccessible to a developer or user—the input and output ports are all that can be accessed, and only select settings, such as the memory map, can be modified within certain limitations. As such, if special alterations to the design are required for the system to function, no changes can be made. This design choice is understandable for a corporation wanting to protect its intellectual property and provides easy access to a developer, but limits its use in systems development significantly.

Conversely, a glassbox processor provides complete access to its internal components for analysis and modification. This impedes its ability to be sold or licensed by a company and can complicate its implementation in a system, but can provide developers enough access to modify the processor to suit the system's needs. While developing a glassbox processor can be time-consuming and difficult, using an established instruction set architecture (ISA) allows the developer to leverage existing technologies with extensive support.

Figure 4:
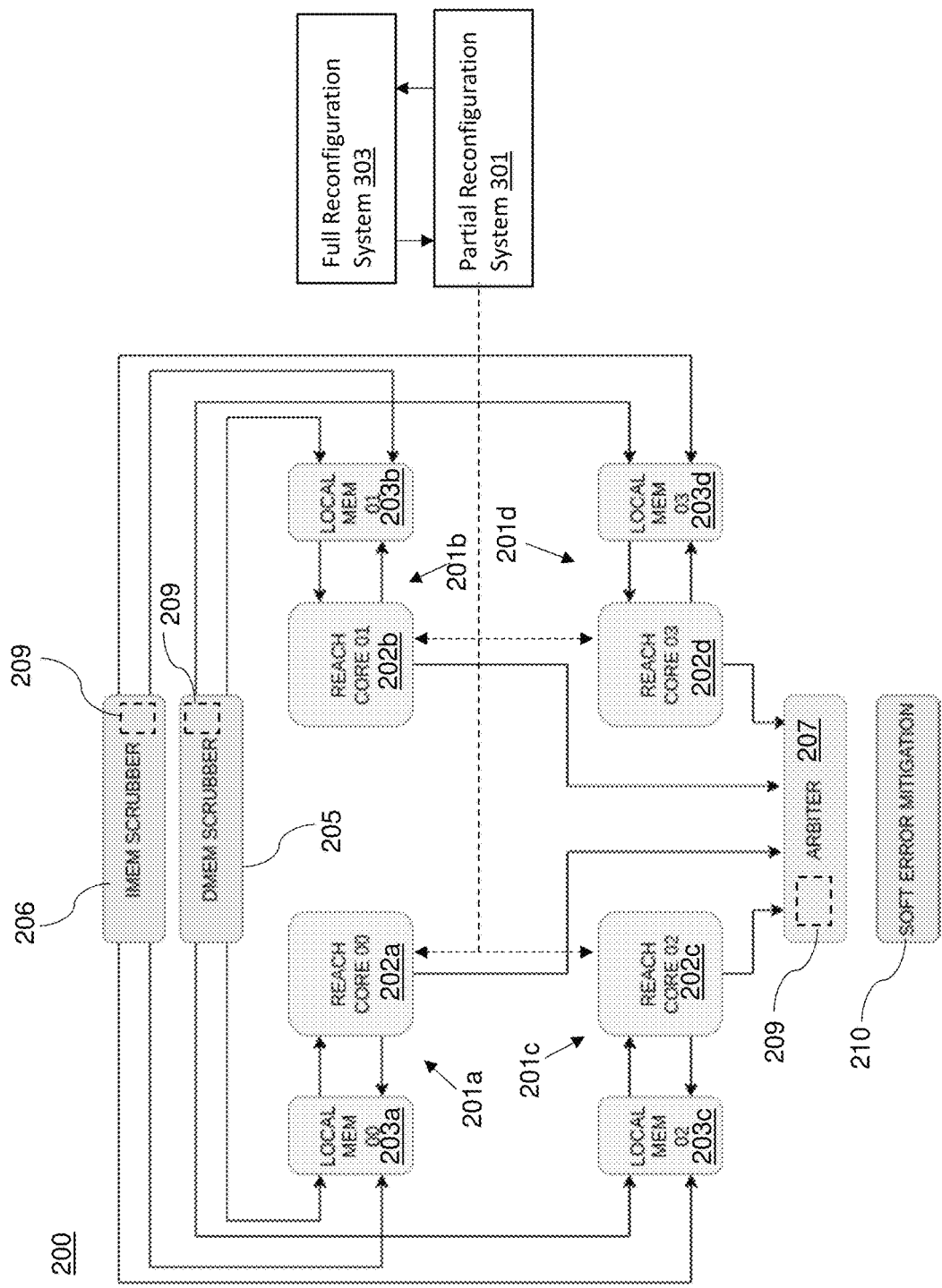
FIG. 4 is a system block diagram schematically illustrating a computer system for mitigating the effects of radiation in space or other high-radiation environments according to various embodiments of the present disclosure.

FIG. 4 is a system block diagram schematically illustrating a computer system 200 for mitigating the effects of radiation in space or other high-radiation environments according to various embodiments of the present disclosure. The architecture of the computer system 200 shown in FIG. 4 may be similar to the RadPC system 100 described above in that it may similarly apply 4MR redundancy, voting mechanisms, and memory scrubbing. The computer system 200 of FIG. 4 may differ from the RadPC system 100 shown in FIG. 3 by changing several components and adding other components to provide further resilience. First, in various embodiments, the proprietary, blackbox softcore processors (e.g., Microblaze softcore processors) of the RadPC system 100 of FIG. 3 may be replaced with glassbox softcore processors utilizing an open source instruction set architecture (ISA). In some embodiments, the softcore processors 201*a*, 201*b*, 201*c* and 201*d* of the computer system 200 of FIG. 4 may include custom-built RISC-V softcore processors. Second, the voting mechanism of the computer system 200 of FIG. 4 may include an arbiter component 207 that may provide voting and overwrite capability for additional critical areas of operation of the computer system 200, such as the registers, program counters, and peripheral devices. Third, the memory scrubber may be extended to include a scrubber component 205 for data memory in addition to a scrubber component 206 for instruction memory. Embodiments of a computer system 200 as shown in FIG. 4 may differ from the RadPC system 100 shown in FIG. 3 in that rather than a checkpoint-based voting system that monitors the outputs from each processor 201*a*, 201*b*, 201*c* and 201*d* for each software cycle, the Arbiter 207 may monitor select sub-components of each processor 201*a*, 201*b*, 201*c* and 201*d* during runtime via a backdoor port access and may utilize a voter component to determine if any processor faults have occurred. Thus, in one embodiment, the computer system 200 may lack the checkpoint register 109 of the computer system 100 and does not use a software checkpoint-based voting system. Similarly, the memory scrubber 205, 206 may continually and iteratively monitor the local memory 203a, 203b, 203c and 203c of each processor 201a, 201b, 201c and 201d as a background process via backdoor access ports, and may include a voting component to detect errors and rewrite corrected memory values.

The system 200 of FIG. 4 may also include a soft error mitigation (SEM) circuit 210 that may be used to scrub the FPGA configuration memory. The system 200 of FIG. 4 may also include a partial reconfiguration (PR) system 301 that may be used to recover individual processor tiles 202a, 202b, 202c and 202d and a full reconfiguration (FR) system 303 that may be used to recover all of the processor tiles 202a, 202b, 202c and 202d and perform a full reset of the computer system 200. In the bock diagram of FIG. 4, each block may represent a component designed using Very High-Speed Integrated Circuit Hardware Description Language (VHDL) and implemented using one or more FPGAs.

It has been shown that COTS microcontrollers are greatly susceptible to SEUs, but lack the features FPGAs can provide to mitigate faults. Combining aspects of a COTS microcontroller with an FPGA may enable leveraging the flexibility of microcontrollers with the mitigation techniques of FPGAs. Such devices are known as softcore processors and have been used by FPGA designers for use in digital systems. While proprietary processors exist and are marketed by FPGA development companies such as AMD-Xilinx or Intel-Altera, many open-source processors are available for use and exhibit extensive documentation and support. Open-source processors may include the advantages of extensive documentation, community support, lack of licensing fees, and ease-of-access for both academic research projects and industry use.

The RISC-V processor architecture has gained popularity over the last few years, having developed an accessible ecosystem for implementation and use in digital systems. The open-source Instruction Set Architecture (ISA) supports several different types of processor cores, allowing 32-bit, 64-bit, and even 128-bit configurations. Multiple versions of complete instruction sets are offered, ranging from basic integer operations to floating-point calculations and more. The most basic functional RISC-V variant is the RV32I, with 40 instructions necessary to run any basic C program.

The RISC-V ISA has been adopted into aerospace research and technologies, with several examples of RISC-V softcore processors being integrated into FPGA designs. For example, A. Wilson et al., "Fault injection of tmr open source RISC-V processors using dynamic partial reconfiguration on SRAM-based FPGAs," 2021 *IEEE Space Computing Conference (SCC)* (2021) describes an experimental setup using RISC-V processors in an FPGA to test the effects of fault injection, leveraging PR as a means of flushing out bit flips in the system. Likewise, Alexander Dörflinger et al., "A framework for fault tolerance in RISC-V," 2022 *IEEE Intl Conf on Dependable, Autonomic and Secure Computing, Intl Conf on Pervasive Intelligence and Computing, Intl Conf on Cloud and Big Data Computing, Intl Conf on Cyber Science and Technology Congress (DASC/PiCom/CBDCom/CyberSciTech)*, pp. 1-8 (2022) describe the use of softcore RISC-V processors in a redundant configuration with ECCs and register-level monitoring to maintain radiation tolerance and continue operation while faults are induced.

Figure 5:
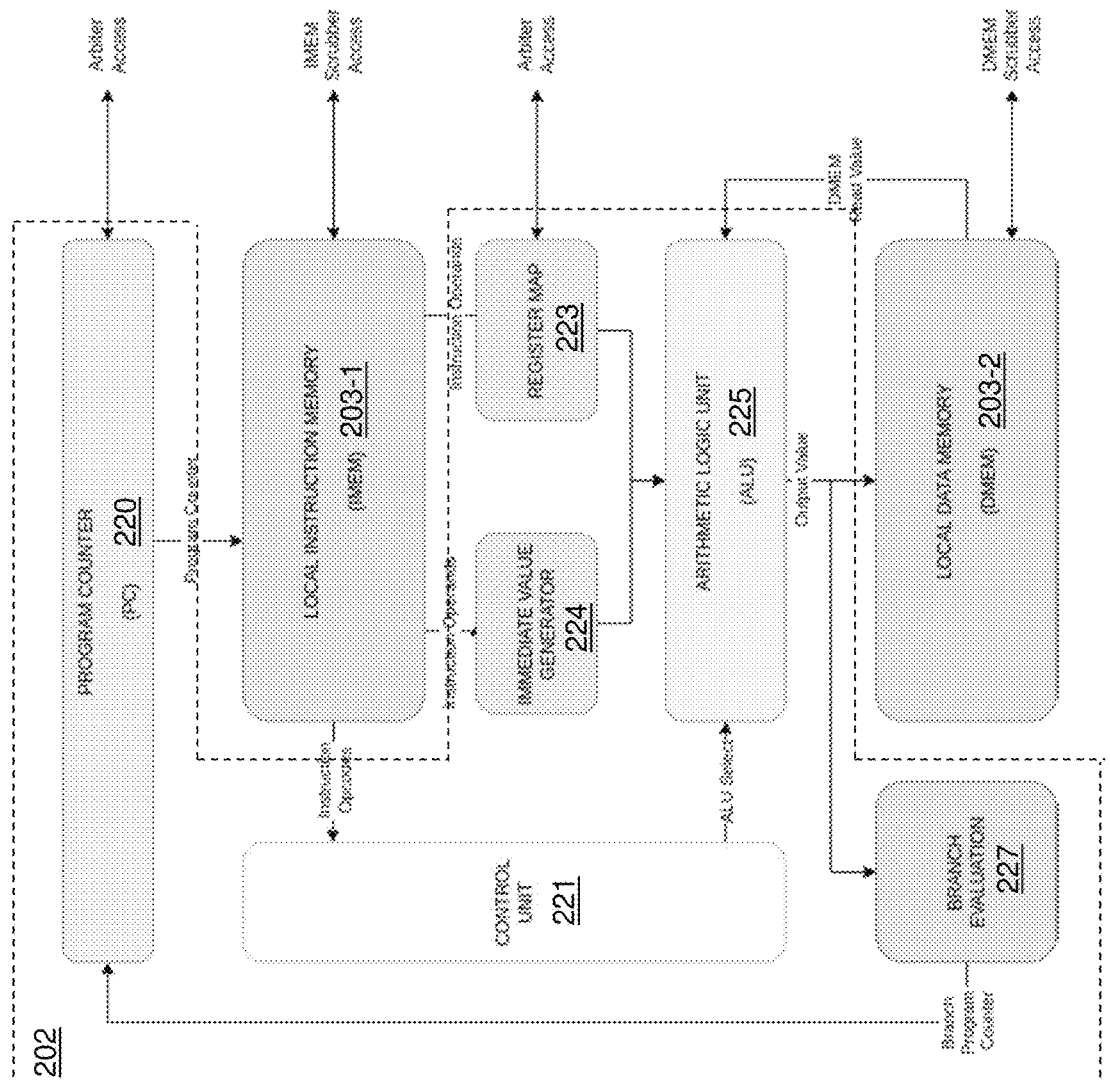
FIG. 5 is a system block diagram schematically illustrating an exemplary processor according to various embodiments of the present disclosure.

In various embodiments, the processors 201a, 201b, 201c and 201d in a computer system 200 as shown in FIG. 4 may include custom-designed RISC-V glassbox softcore processors, which may also be referred to as "Reach" core. FIG. 5 is a system block diagram schematically illustrating an exemplary processor 201 according to various embodiments. Each processor 201 may include an above-described "Reach" processor core 202 with associated local memory 203, including local instruction memory 203-1 and local data memory 203-2. As in the RadPC system 100 described above, the "Reach" processor core 202 may be subject to reconfiguration and repair via PR and may also be referred to as a processor "tile." The local instruction memory 203-1 and the local data memory 203-1 may not be subject to PR but may instead be corrected via memory scrubbing as described in further detail below. As discussed above, a computer system 200 according to various embodiments may have a redundant design including multiple (e.g., three or more, such as four) instances of a processor 201 as shown in FIG. 5. The computer system 200 of FIG. 4 illustrates a 4MR architecture that includes four redundant processors 201a, 201b, 201c and 201d. The multiple redundant instances of the softcore processor 201 may be implemented in one or more FPGAs.

Referring again to FIG. 5, in various embodiments the processor tiles 102 described above with reference to the RadPC system 100 may be replaced with custom-designed RISC-V glassbox "Reach" processor cores 202. In some embodiments, the "Reach" processor cores 202 may include the RISC-V RV32I configuration, which is a relatively simple instruction set/feature set provided by the ISA, with forty instructions for basic integer arithmetic. The "32" indicates that all values in operation are 32-bit, and the "I" indicates integer-only operations. However, it will be understood that other configurations for the "Reach" processor cores 202 are within the contemplated scope of disclosure. Where many processors perform instruction fetching, decoding, and execution in sequential order, the RISC-V performs these steps in parallel via combinational logic.

During operation of the "Reach" processor core 202, the Program Counter (PC) module 220 creates a program counter signal that increments with each clock cycle or skips to a branched instruction address. This value is used to address the Instruction Memory (IMEM) 203-1 and fetch the current instruction. The operation code (i.e., opcode) is pulled from the instruction memory 203-1 and is read by the Control Unit 221, indicating which instruction, which arithmetic operation, and which data paths are to be executed. The instruction also includes the necessary operands, which are used to fetch the desired register values from the registers 223 or to generate an appropriately-signed immediate value using an intermediate value generator 224. These components are fed into the Arithmetic Logic Unit (ALU) 225 and branch evaluator 227, which determine the result of the instruction and the address of the next instruction. Finally, any instructions that require storage in a memory device are read to Data Memory (DMEM) 203-2 or a peripheral device (not shown in FIG.

The processor 201 additionally includes external ports for providing access to the Arbiter 207 and memory scrubber(s) 205 and 206 (see FIG. 4), which will be discussed in greater detail below.

Given these basic processor requirements, slight modifications may be made to ensure ISA compliance while allowing for correction systems. Unlike most RISC-V softcore processors, read/write access is granted to the registers and program counter by both the CPU control unit and the error correction mechanisms, such as the above-described Arbiter 207. The memory map may also provide backdoor access to the memory scrubber components 205 and 206, allowing erroneous values to be corrected as CPU access is momentarily restricted. In various embodiments, the SEM 210 (see FIG. 4) may oversee the configuration memory for each processor tile 202a, 202b, 202c and 202b but may not be controlled by the processor(s) themselves.

In various embodiments, the memory devices interfaced by the CPU (i.e., the above-described Reach processor cores 202), which include the IMEM 203-1, the DMEM 203-2, and any peripheral memory devices, may be handled by a Memory Management Unit (MMU) component. The MMU may route the memory read/write data, address, and read/write enable signals to the memory devices 203-1 and 203-2, referencing a hardcoded memory map to ensure that the correct data is accessed by the device. The IMEM and DMEM components 203-1 and 203-2 may be considered local memory. Each Reach processor core 202 may have its own memory copy that cannot be read or written by any other Reach processor core 202 other than itself. The IMEM and DMEM components 203-1 and 203-2 may also be considered dual-port devices, because the memory scrubber(s) 205 and 206 may access addresses of the IMEM and DMEM components 203-1 and 203-2 via a secondary port to correct errors.

Figure 6:
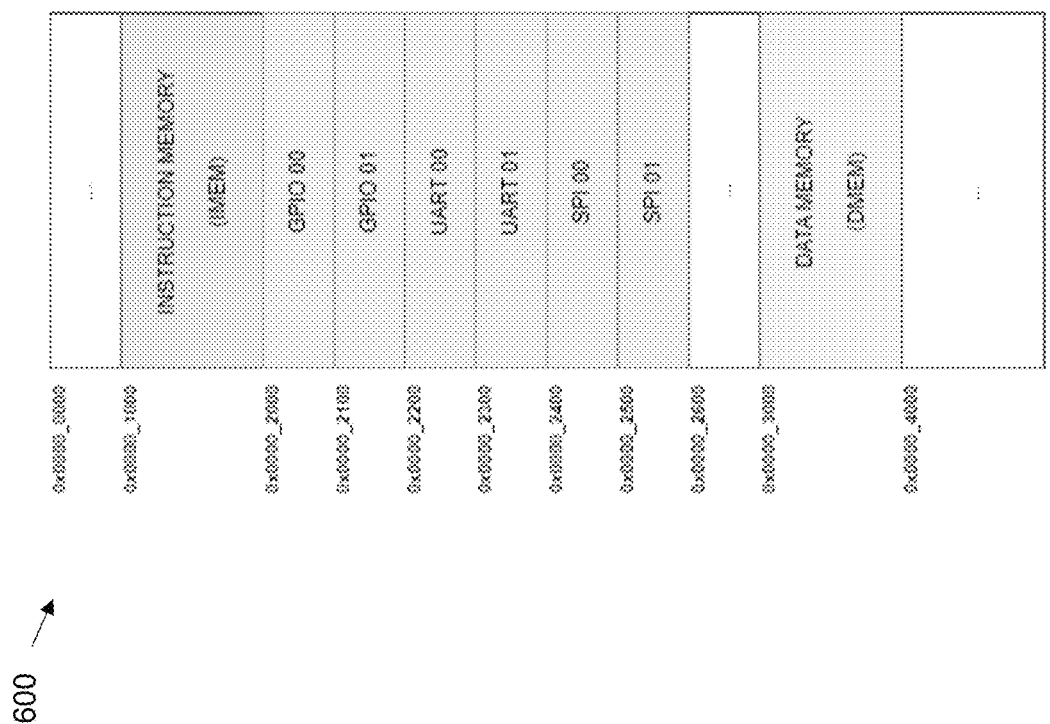
FIG. 6 is a block diagram schematically illustrating an exemplary memory map for a computing system according to various embodiments of the present disclosure.

FIG. 6 is a block diagram schematically illustrating an exemplary memory map 600 for a computing system 200 according to various embodiments of the present disclosure. As mentioned above, the IMEM and DMEM devices 203-1 and 203-2 may be considered local to the processor 202, as are the memory-mapped registers of the peripheral devices. The input/output lines to the peripheral devices, however, may be considered to be global.

Referring to FIG. 6, The memory map 600 may allow for addresses extending from 0x00000000 to 0xFFFFFFFF in hexadecimal, but the sizes of the memory devices may be limited to the FPGA device. As such, all start addresses and sizes for components in the memory map may be defined in a VHDL package file and constrained to fit the FPGA selected. The IMEM and DMEM components 203-1 and 203-2 may be required for basic operation, with each set to 4096 bytes (4 kilobytes) of memory in one non-limiting example. In some embodiments, the memory map 500 may be enabled to use GPIO, UART, and SPI components, which qualify as memory components in that the registers controlling each of these peripherals are treated as address spaces.

With the exception of defining peripherals, FPGA memory devices may be best implemented by using a device's block random access memory (BRAM) modules. Interfacing VHDL code with these devices usually requires a template VHDL component, provided by the FPGA vendor that ensures the synthesis tools understand the need to use BRAM. Such templates often allow for single-port or dual-port RAM devices, meaning the number of ports accessing memory are inherently limited. Designing a tri-port memory, for example, may cause the synthesis tool to consume lookup tables (LUTs) and inefficiently use BRAM to meet the design requirements.

The memory model for an embodiment computer system 200 may require byte-accessible memory and support read/write operations of bytes, halves (16-bit data), and words (32-bit data). As such, each memory device (IMEM and DMEM) may consist of 4 BRAM components whose contents are pieced together to satisfy byte, half, and word operations. For example, if an instruction requires that a full word be read, the memory device would fetch a byte from each BRAM component and assemble them into a full 4-byte word for the CPU. These operations are conducted by the above-described MMU. Each Reach core CPU and MMU may be considered a part of a reconfigurable processor tile. IMEM and DMEM are not considered as such because correction of their errors may be more effectively handled by the scrubber component(s).

In various embodiments, software may be loaded into the IMEM memory 203-1 through the use of a dedicated workflow that compiles C code into machine code. In some embodiments, programs that that are run on the computing device 200 may be written in C and compiled using a free GCC toolchain provided by the RISC-V collaboration. In general, a collection of C and H files can be written as any standard microcontroller project, then may compiled into an output file to be loaded into instruction memory 203-1. A startup program, written in Assembly and called the C Runtime Startup (crt0) may be used to set up the global pointer (GP), stack pointer (SP), and clear the block starting symbol (BSS) region. These instructions may all be loaded into IMEM VHDL via a Python script that reads the output file, and can be accessed when the VHDL components are synthesized and implemented onto the FPGA. Additionally, the disassembly may be exported to a file for debugging and review purposes.

Figure 7:
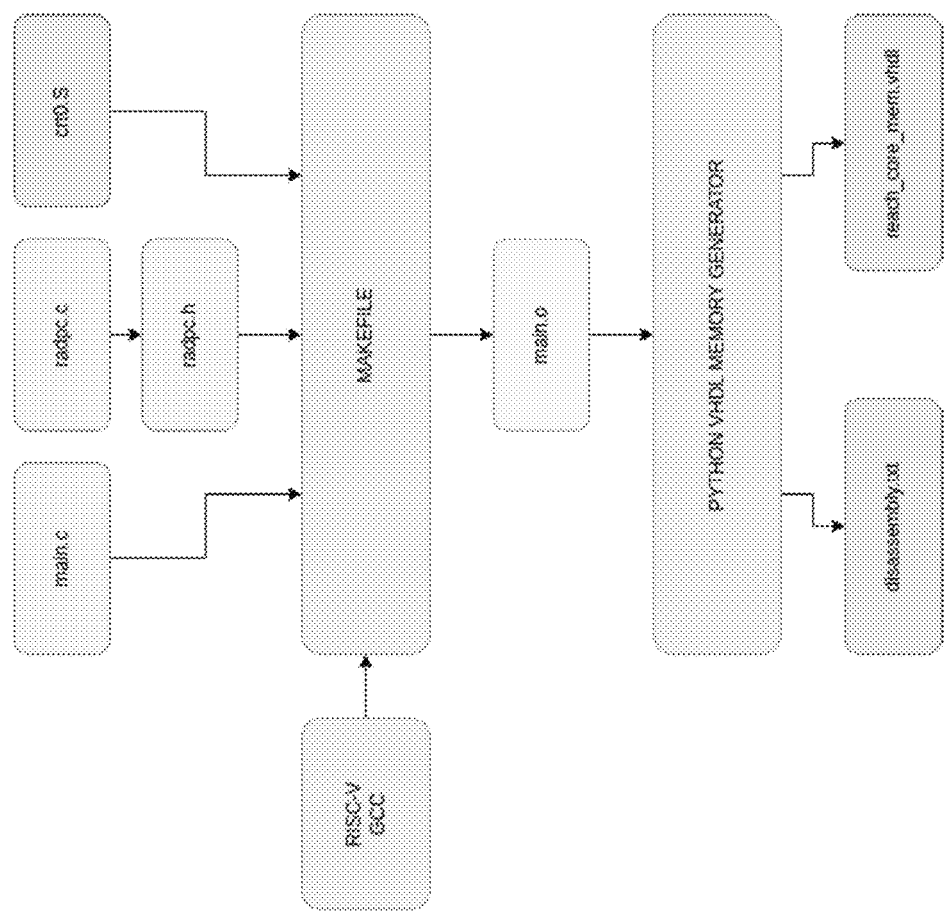
FIG. 7 is a block diagram that schematically illustrates the process flow of compiling a C program into VHDL code for execution by a computing system according to various embodiments of the present disclosure.

FIG. 7 is a block diagram that schematically illustrates the process flow of compiling a C program into VHDL code for execution by a computing system 200 according to various embodiments. Although FIG. 7 illustrates the compilation of a C program using the RISC-V GCC toolchain, it should be noted that the toolchain supports other means of compilation, such as Clang, which may provide a more portable means of compilation. Additionally, the bare-metal standalone nature of the RISC-V processor does support other programming languages and compilers that can create their own standalone libraries, such as Rust.

As in the RadPC computing system 100 described above with reference to FIG. 3, a computing system 200 including multiple redundant processor tiles 202 according to various embodiments may additionally include one or more voting sub-components. In various embodiments, both the Arbiter 207 and the memory scrubber(s) 205, 206 may include voting sub-components 209, as shown in FIG. 4. In the case of a four-modular redundancy (4MR) computing system 200 as shown in FIG. 4, the voting subcomponents 209 may be configured to route a "correct" majority value from four inputs (i.e., one from each redundant processor 201a, 201b, 201c and 201d) while also reporting any compromised inputs. In some embodiments, the voting subcomponent 209 may be a combinational logic circuit to limit the time it takes to evaluate component outputs.

In most cases, a majority value can be determined by the voting component(s) 209 from four signals. There are five cases of signal votes that can be seen in a 4MR system, with varying likelihoods of occurrence and repair success. Table 1 describes the possible combinations of voter inputs expected by the system.

TABLE 1

| Correct Inputs That Agree | Incorrect Inputs That Agree | Incorrect Inputs That Disagree | Majority? | Repair required? |
|---|---|---|---|---|
| 4 | 0 | 0 | Yes | No |
| 3 | 0 | 1 | Yes | Yes |
| 2 | 0 | 2 | Yes | Yes |
| 2 | 2 | 0 | No | Yes |
| 0 | 0 | 4 | No | Yes |

As shown in Table 1, the first case is standard operation, in which all four values are in complete agreement and so the majority value matches all four inputs. No repairs are required to recover the system.

The second case is a single error, where any three values are in agreement but the fourth value disagrees. A majority value can be derived from the three values in agreement, but repairs will have to be conducted on the system that output the fourth value. This is the most likely error to occur as an SEE affecting a processor 201—even affecting multiple bits within a tile processor—will most likely be confined to a single processor region in the FPGA.

The third case occurs when only two inputs agree with each other. The two inputs in disagreement include values contrary to the two inputs that agree but also to each other. In this case, a majority value is still clear as the correct value must come from the two agreeing processors 201, and so a repair must be conducted.

The fourth case is a variation of this scenario, but resulting in a failure to find a majority value. The first two inputs still agree with each other, but the other two inputs agree with each other and disagree with the first pair. Thus, a stalemate is reached and a majority value cannot be found. A repair is necessary to restore functionality, though any attempt at a majority value cannot be trusted. This is a rare scenario in that the random nature of SEEs must be enough to flip enough bits such that two tiles fail identically, which is extremely unlikely during regular operation.

The final case results when none of the inputs agree with each other. In this case, a majority output is impossible and repair is required. The likelihood of this scenario occurring naturally in a space environment is incredibly low and would require a full reset and reconfiguration of the FPGA to return to standard operation.

As noted above, the computer system 200 as shown in FIG. 4 may include an arbiter component 207 having a voting subcomponent 209 that may provide voting and overwrite capability for additional critical areas of operation of the computer system 200, such as the registers, program counters, and peripheral devices. Peripheral devices on the computer system 200, such as general purpose input output (GPIO) ports or serial communication devices, can use a single voter to regulate outputs. Data that is fed back into each of the Reach processor cores 202, such as values stored in the registers 223, may require not only voting to determine the correct majority value but also a means of correction to prevent bad data from propagating.

Consider the example of a basic counting program. In a standard microcontroller, a value from memory would be stored to a register, sent into the ALU to be incremented by a value in another register, and then stored in a third register. The final value would be sent back to memory, to be accessed at a future time. If any of these three registers were to experience an SEE, the program's execution would be altered at any future time the system wishes to access the initial value.

In various embodiments, each of the Reach processor cores 202 of the computing system 200 provide backdoor access to each register 223 of the respective core 202 to an Arbiter component 207 that is configured to vote on the correct register values and to overwrite bad data. In various embodiments, the Arbiter 207 may check each of the registers 223 of the Reach processor cores 202, determine which values are erroneous, and correct the faulty tiles 202 within a single instruction cycle of operation of the computer system 200. In some embodiments, voting may be performed by instantiating multiple voter subcomponents 209 within the Arbiter 207 that may each evaluate the same register across all four Reach processor cores 202a, 202b, 202c and 202d. When a voter subcomponent 209 detects an incorrect value through its majority selection, it may raise a flag that signals the Arbiter 207 to enable a write to the affected Reach core(s) 202 and refresh the faulty register value(s) with the majority value.

The program counters (PCs) 220 of the Reach processor cores 202 are also technically registers, although they cannot be directly accessed as in the case of the other register components. As this "register" is essential to synchronizing each Reach processor core 202, it may be refreshed along with all other registers whenever the Arbiter 207 demands a write. This ensures that, for any given instruction, the Arbiter 207 can guarantee that all voted register values correspond to the same instruction and do not reflect different states of program execution. It also "freezes" the instruction momentarily, ensuring that the registers 223 cannot be affected by a processor operation but only by an Arbiter 207 write operation.

Figure 8:
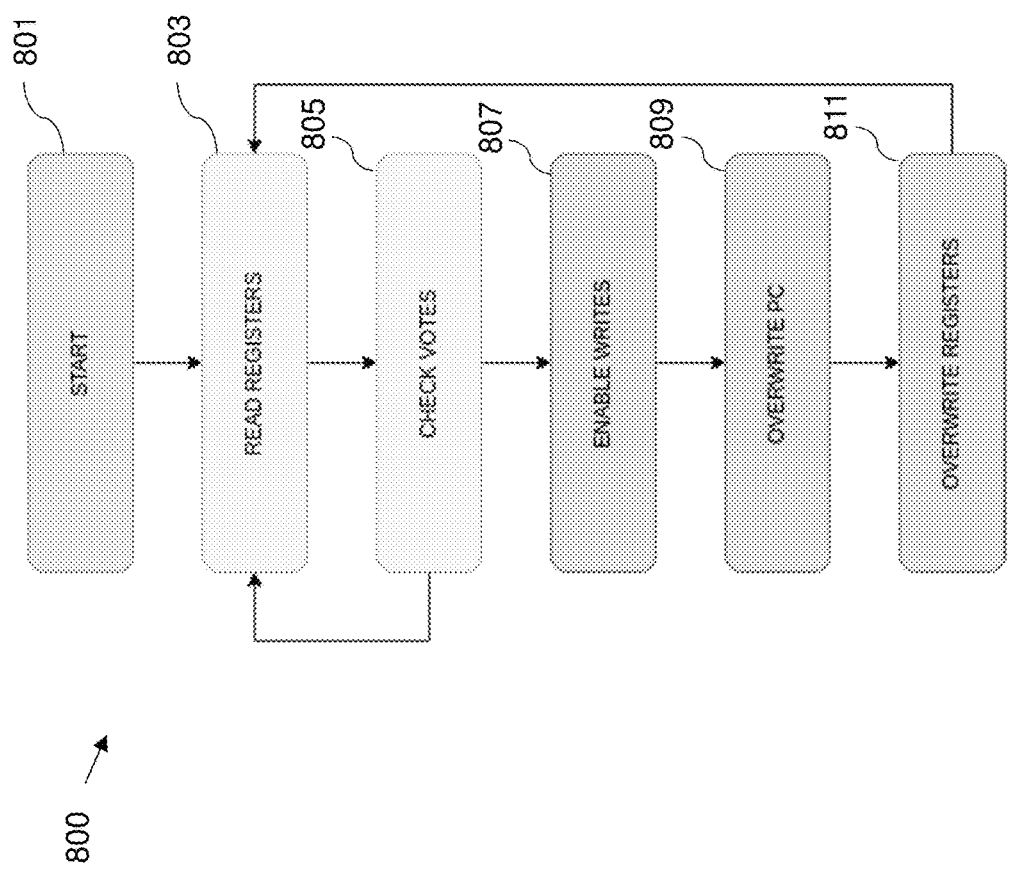
FIG. 8 is a flow diagram illustrating a method performed by an arbiter according to various embodiments of the present disclosure.

FIG. 8 is a flow diagram illustrating a method 800 performed by an Arbiter 207 according to various embodiments of the present disclosure. At the start of the method 800 in block 801, the Arbiter 207 may instantiate one or more voter subcomponents 209. As discussed above, the Arbiter 207 may instantiate multiple voter subcomponents 209, where each voter subcomponent may evaluate the same register across all of the Reach processor cores 202. In block 803, the voter subcomponent(s) 209 may read and compare the register values for all of the registers in the different Reach processor cores 202. In block 805, the Arbiter 207 may determine whether any of the registers contain an incorrect value based on a voting disagreement between register values. In the event that all votes agree across all of the registers, the method 800 may stop and the Reach processor cores 202 may proceed to the next instruction.

However, in response to determining that the votes do not agree for one or more sets of registers, the Arbiter 207 may enable a write operation in block 807. As discussed above, the Arbiter 207 may access the registers 223, including the program counters (PCs) 220, for each Reach processor core 202, via backdoor access ports as shown in FIG. 5. In block 809, the Arbiter 207 may overwrite the program count values for each of the program counters (PCs) 220. As discussed above, this may help to ensure that the register values correspond to the same instruction and "freezes" the instruction momentarily to enable the Arbiter 207 to write to the registers 223 without interference. In block 811, the Arbiter 207 may write the correct register values to each register that was determined to have an erroneous value.

As discussed above, the method 800 shown in FIG. 8 may be performed within a single instruction cycle of the computer system 200, and the method 800 may be repeated for each instruction cycle of operation of the computer system 200.

Providing a separate voting subcomponents 209 to evaluate each register of the computer system 200 is not trivial in terms of FPGA footprint, but it is feasible in terms of successful error mitigation and resolution. Similar voting subcomponents could be utilized to check for disagreements in the local memories 203 of the respective processors 201, but it is generally not efficient or feasible to provide a voting mechanism for every single cell in a memory device. An FPGA designer could connect every single value in memory to a voter circuit for evaluation, but FPGA resource usage for memory devices can consume large amounts of lookup tables (LUTs) if not properly constrained.

Thus, in various embodiments, one or more scrubbers 205 and 206 may be used to mitigate errors in the memory devices 203. In the embodiment shown in FIG. 4, separate scrubbers 205 and 206 are shown for correcting errors in the local instruction memory 203-1 and in the local data memory 203-2 of each processor 201, although it will be understood that a single scrubber may be used to correct errors in both the local instruction memory 203-1 and in the local data memory 203-2.

Given the byte-wise nature of the MMU in a computer device 200 as shown in FIG. 4, the memory scrubber 105 from the RadPC architecture (see FIG. 3) may not be suitable for the new memory map. As the Reach processor cores 202 provide access to both IMEM and DMEM memories 203-1 and 203-2, each with bytewise access, in various embodiments, the memory scrubber(s) 205 and 206 may be configured to read all of the cells quickly and effectively. The memory scrubber(s) 205 and 206 may also not conflict with current write operations coming from the CPU, lest a contention in rewriting an erroneous cell further compromise a Reach processor core 202.

The scrubber(s) 205, 206 for the computer device 200 shown in FIG. 4 may achieve these ends by running perpetually in the background, beginning at the start address of a memory device 203-1, 203-2 and iterating through each value until the maximum address. This process may repeat as long as the computer device 200 is not in a reset state, as discussed further below. The scrubber(s) 205, 206 may iterate through each memory device in lockstep, accessing the same address in each local memory 203-1 and 203-2 of the respective processors 201 simultaneously. The scrubber(s) 205, 206 may include a voting subcomponent 209 that reads and compares the contents of each memory address across all four processors 201 of the computer system 200. An underlying assumption with this operation is that there is no skew in the memory read/write process and that the memory is accessed at the base clock rate of the system.

Figure 9:
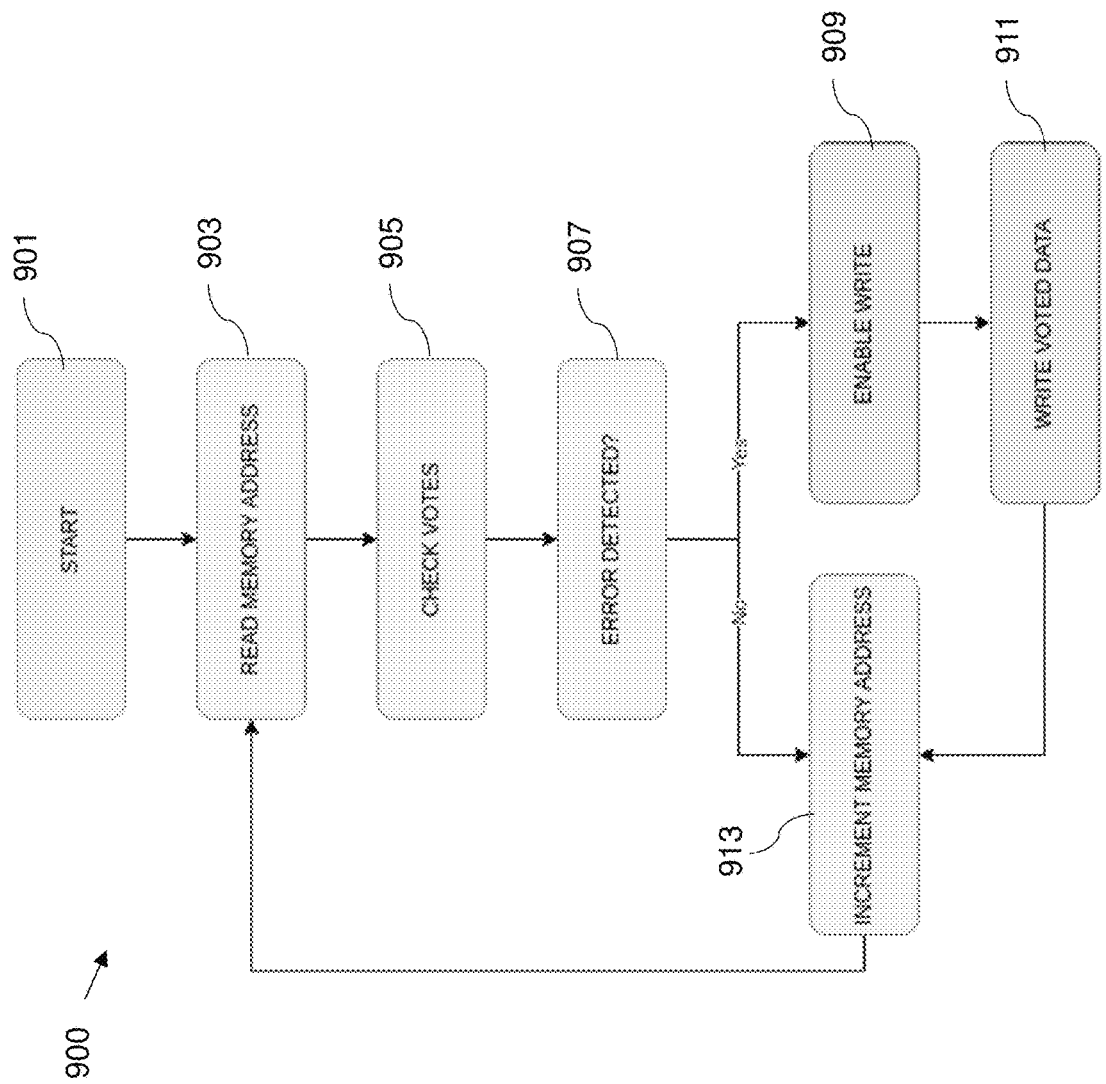
FIG. 9 is a flow diagram illustrating a method performed by a memory scrubber according to various embodiments of the present disclosure.

FIG. 9 is a flow diagram illustrating a method 900 performed by a memory scrubber 205, 206 according to various embodiments of the present disclosure. As discussed above, the method 900 shown in FIG. 9 may be an iterative process that may be continually performed as a background process during normal operation of a computer system 200 as shown in FIG. 4. Following the start of the process in block 901, the scrubber 205, 206 may read a first memory address in block 903. As discussed above, the scrubber 205, 206 may access the same first memory address across all of the redundant local memory devices 203a, 203b, 203c and 203d. Where the memory devices 203 in the computing system 200 are byte-wise addressable, the scrubber 205, 206 may read full (e.g., 32-bit) words at a time according to various embodiments. The scrubber 205, 206 may access the local memory devices, including the instruction memory (IMEM) and the data memory (DMEM), via backdoor access ports, as discussed above with reference to FIG. 5.

In block 905, the scrubber 205, 206 may check for a voting disagreement from the voter subcomponent 209 between the memory words from the respective local memories, and may determine whether or not an address is to be rewritten in determination block 907. In response to a determination that an address is to be rewritten (i.e., determination block 907="Yes"), the scrubber 205, 206 may enable a write operation in block 909, and may write the correct (i.e., majority value) data to the appropriate address in block 911. The memory address may then be incremented in block 913, and the method 900 may return to block 903 to read the subsequent memory address and the process may be repeated. In response to a determination that no rewrite is needed, such as when there is no voting agreement between the memory words from the respective local memories, (i.e., determination block 907="No"), the method 900 may proceed directly to block 913 to increment the memory address, and the process may be repeated.

As discussed above, the method 900 of FIG. 9 may continue iteratively over each memory address in the local memories 203 of the processors 201 as a background operation. In some embodiments, a single scrubber may iteratively check all of the memory addresses of the local memories 203, including the instruction memory (IMEM) and the data memory (DMEM). Alternatively, multiple scrubber components 205, 206 may operate simultaneously to check the memory addresses, such as a first scrubber component 205 that checks the local instruction memory (IMEM) of each processor 201, and a second scrubber component 206 that checks the local data memory (DMEM) of each processor 201.

In some embodiments, the voter subcomponent 209 of the scrubber 205, 206 that reads each of memory words may control whether or not an address is to be rewritten by using the syndrome value to control the read/write enable. This may ensure that each memory device is rewritten with the correct majority value when errors are detected. For CPU read cycles of the memory device, contention is generally not a concern. The odds of a write contention are remarkably low but in various embodiments the scrubber may be configured to pause if it detects that a write at the address being checked is occurring from the CPU end.

It may be possible for errors in a memory device to be accessed by the CPU before the scrubber 205, 206 can access the values and rewrite them. In such a case, the above-described Arbiter 207 may correct any errors that propagate from memory and into the registers. It is just as possible for an error in a memory device to exist in a memory address that the CPU never accesses. This will result in the scrubber 205, 206 quietly rewriting that address without the CPU ever interacting with an erroneous value.

In various embodiments, the computer system 200 may have selective redundancy in that only certain components (e.g., the Reach processor cores 202 and associated local memories 203) may be redundant. Other components of the system 200, such as the Arbiter 207, the scrubber(s) 205, 206 and/or the voter subcomponents 209 may not be duplicated throughout the computer system 200. This may be to effectively meet the balance between device resource usage, power consumption, resilience, and design complexity. In other embodiments, a computer system 200 may include multiple redundant instances of the such as the Arbiter 207, the scrubber(s) 205, 206 and/or the voter subcomponents 209.

An FPGA's real-time logic (RTL) is determined by its configuration memory, which holds the settings for the FPGA required to implement a design. Most FPGAs have error correction codes (ECCs) within each configuration memory location that can allow for detection and correction of single-bit and double-bit adjacent faults. These codes are a series of flag bits that can be checked against the data in the memory location and help determine if any bits have flipped. A component external to or within the FPGA can read these codes and, in the event of an upset, correct the flipped bit. Perpetual monitoring of configuration memory is required to prevent multiple bits from accumulating over time, as large numbers of upset configuration memory locations will inevitably compromise the design.

A computer system 200 according to various embodiments may also include a Soft Error Mitigation (SEM) controller 210 as shown in FIG. 4. In some related systems, a SEM controller 210 has been used to read the configuration memory of the FPGA and continually scan each address in search for faults. As the SEM controller 210 checks each location in memory, it checks for discrepancies between the memory contents and the ECC codes.

In various embodiments of the present disclosure, the SEM controller 210 may be used to oversee the FPGA configuration memory and for correcting single-bit and double-bit adjacent errors. However, in some embodiments, the SEM controller 210 may not actively interface with any other correction components, such as the Arbiter 207, the memory scrubber(s) 205, 206 and their associated voting components 209. Each Reach processor core 202, however, may be able to read the SEM controller's 210 status data and syndrome reports through the MMU. While this does not directly affect error mitigation or resolution, this mechanism may allow a potential developer to execute certain operations with an awareness of the current radiation environment.

An FPGA can have its logic fully reset to a known state using full reconfiguration (FR). As the real-time logic (RTL) is set by the configuration memory of the device, which is inherently volatile, resetting power is enough to clear the device and reconfiguration is enough to bring the device's logic to a fully reset and refreshed state of operation. For instance, if an FPGA device were to suffer enough SEEs to upset its configuration memory and compromise performance, a full reconfiguration of the device would be enough to wipe away all faults and bring the device back to a known state of functionality. While this is a valid means of SEE recovery, any work done by the device is lost in the reset.

Partial reconfiguration (PR), a counterpart to FR, has been introduced as a feature of FPGAs and may be used in a computer system 200 according to embodiments of the present disclosure. Many modern FPGAs offer the ability to reconfigure a predefined region of the configuration logic while the device is running. This is usually conducted using proprietary, device-specific software that can mark a region of the device as viable for reconfiguration. The rest of the FPGA continues operation, though it is up to the FPGA designer to ensure that all logic not undergoing reconfiguration remains functional. Technically, the SEM's recovery behavior is a form of PR—albeit on a focused memory word-by-word basis.

If an FPGA were to suffer enough SEEs in a specified PR region, that region could be refreshed using PR to bring the logic back to a known state. The rest of the FPGA continues to function as normal and the reset region will eventually be brought back online with the rest of the logic. This process may be performed when SEE faults cannot be removed through other error mitigation/correction strategies. The time taken for a PR depends on the size of the region to be reconfigured and the configuration clock available on the FPGA device.

It is important to note that FPGA devices do not allow for write contention in the configuration memory and thus require some means of arbitration between the SEM 210 and any external devices performing PR. In some cases, the SEM 210 may be momentarily disabled while a PR occurs and is then reset so as to be made "aware" of the reconfiguration. Some related systems have used a series of multiplexers to manage access to the Internal Configuration Access Port (ICAP) between the PR-performing device and the SEM 210.

Computer systems 200 according to various embodiments of the present disclosure may use PR and FR to resolve tile errors. In some embodiments, only the CPU elements of each processor 201 (ALU, PC, registers, etc.) are partially reconfigured. As both FR and PR refresh all BRAM devices to their initial states, memory devices may be left alone to be repaired by the scrubber(s) 205, 206. This may cut down reconfiguration time significantly. While registers may also be reset to their initial states during the PR, the scrubber is fast enough to refresh all values that no significant additional delay is noticeable in the system.

Example

An embodiment computer system 200 was tested using both simulation suites and physical hardware. As related devices have used Xilinx FPGAs, a device from the Artix-7 family was selected to perform testing of the embodiment computer system 200. The previous lunar mission had used an Artix XC7A35T FPGA, and all RTL was tested on the Digilent Basys 3 board. Since the design has increased in size, due to the added recovery mechanisms, a larger FPGA was chosen.

The embodiment computer system 200 was tested on a Xilinx Artix-7 XC7A200T, using the AC701 Evaluation Kit. Table 2 is a comparison of the resources available in both the XC7A35T and XC7A200T FPGAs. Both FPGAs have been used for previous RadSat missions, so flight heritage and familiarity with the design environment are advantageous in using this FPGA family. The XC7A200T is the largest device provided in the Artix-7 family, with the greatest number of logic components and block RAM memory components available for use in the series. While a device this large is not strictly necessary to run the embodiment computer system 200 architecture, it ensures the freedom to develop minimal functionality without worry about optimizing the architecture for LUTs or BRAM usage. Table 3 provides an analysis of the FPGA resource utilization of the embodiment computer system 200 design.

TABLE 2

|  | XC7A35T | XC7A200T |
| --- | --- | --- |
| Logic Cells | 33,280 | 215,360 |
| Slices | 5,200 | 33,650 |
| Flip Flops | 41,600 | 269,200 |
| Block RAM | 1.8 Mb | 13.14 Mb |
| I/O Pins | 250 | 500 |

TABLE 3

|  | LUTs | BMEM | Flip-Flops |
| --- | --- | --- | --- |
| Total System | 28,096 | 17.50 | 9,091 |
| Reach Core Tile | 5,714 | 2 | 1,548 |
| Arbiter | 3,409 | 0 | 7 |
| Scrubber | 165 | 0 | 33 |

Within hardware, the Xilinx Integrated Logic Analyzer (ILA) was used to monitor signals and collect screenshots. The ILA is a proprietary IP core that allows a developer to tap into the internal signals of an FPGA design and monitor the system's activity. Triggers can be set to check for specific values and transitions. Given the limited practical input/output ports (I/O) of the AC701 board, all measurements were made using ILA ports.

Figure 10:
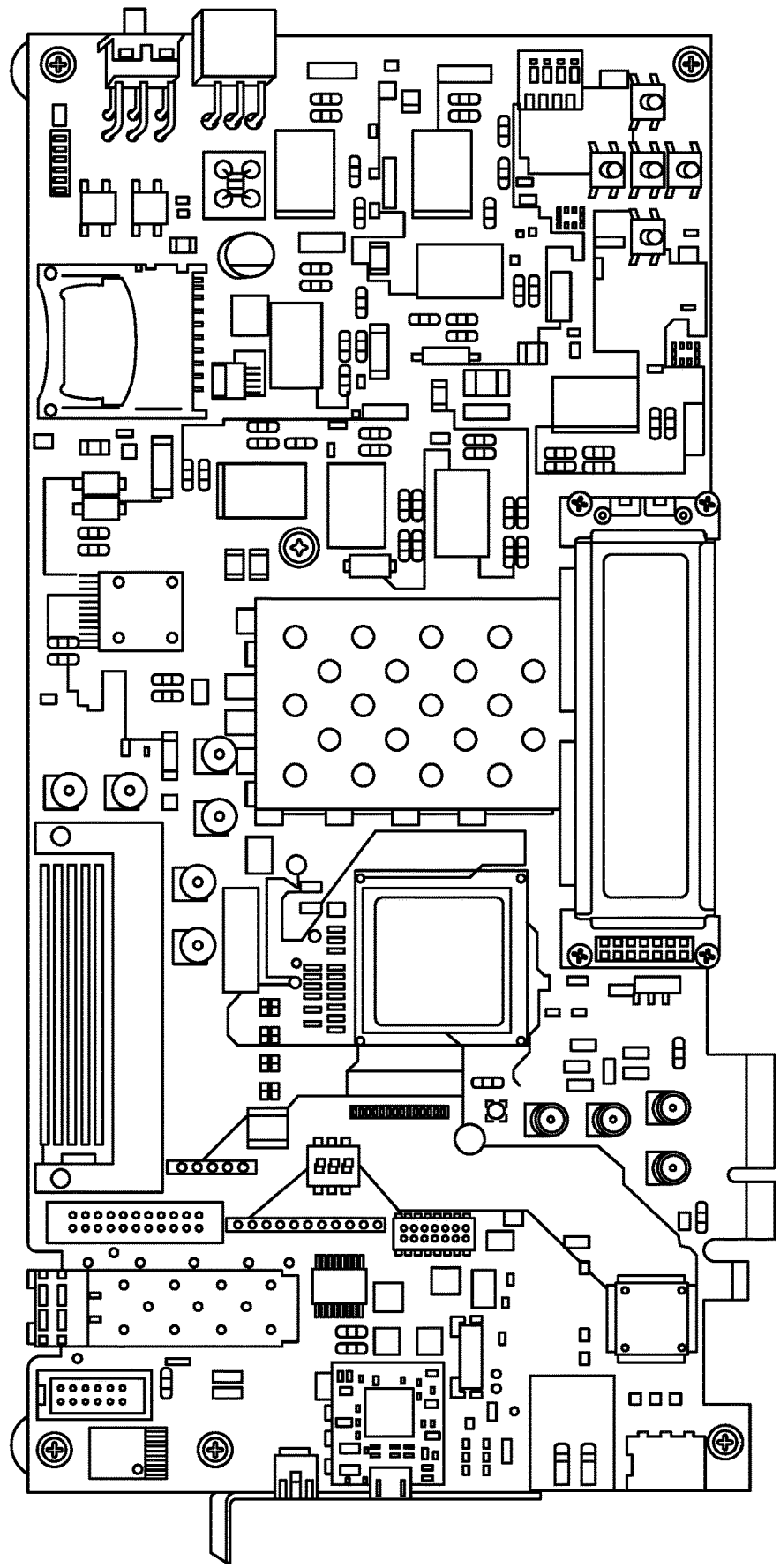
FIG. 10 is a photograph illustrating an experimental setup for testing a computing device according to various embodiments of the present disclosure.

FIG. 10 is a photograph illustrating the experimental setup using the AC701 FPGA board. Xilinx's Vivado ML 2022.2 suite was used to synthesize the hardware description language (HDL) and implement the RTL onto the board. The suite also allows for simulation, and thus was used for all simulations and waveform screenshots presented in this disclosure. All serial output was captured using Minicom. The entire design process was conducted in Ubuntu Linux.

Related computer systems have implemented a simple integer counter as the test C program. This allows the system to run an initialization state and a perpetual loop, simulating a regular microcontroller process, while being subject to injected faults and natural radiation strikes. On initialization, a value in memory is reserved and set to zero, and on each loop, the value is read from memory, incremented, and stored. This allows the processors to suffer potential impacts from radiation in their registers, memory, and peripheral outputs.

Figure 11:
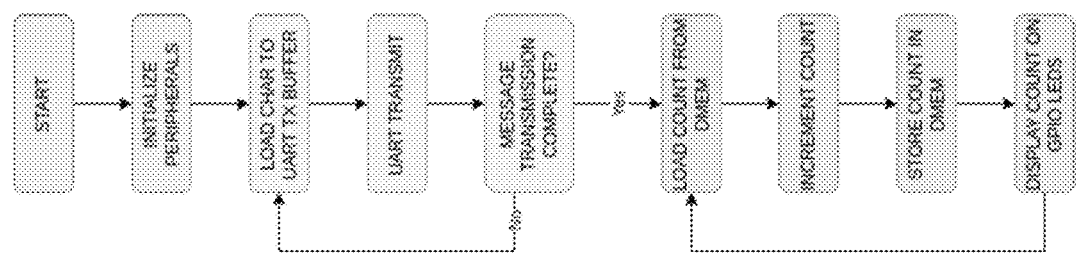
FIG. 11 is a flow diagram illustrating the process flow of test software used to test a computer device according to various embodiments of the present disclosure.

The same program was used for the testing of the embodiment computer system 200, with an added step before the loop to demonstrate the system's ability to vote on serial peripherals (UART) as well as parallel (GPIO). The phrase "Hello space!" is transmitted on startup and is used in simulation and hardware. Since a UART transmission in C requires activating and monitoring the peripheral, a susceptibility in the registers or memory could result in a garbage transmission that threatens the system's operation. FIG. 11 is a flow diagram illustrating the process flow of the test software.

Figure 12:
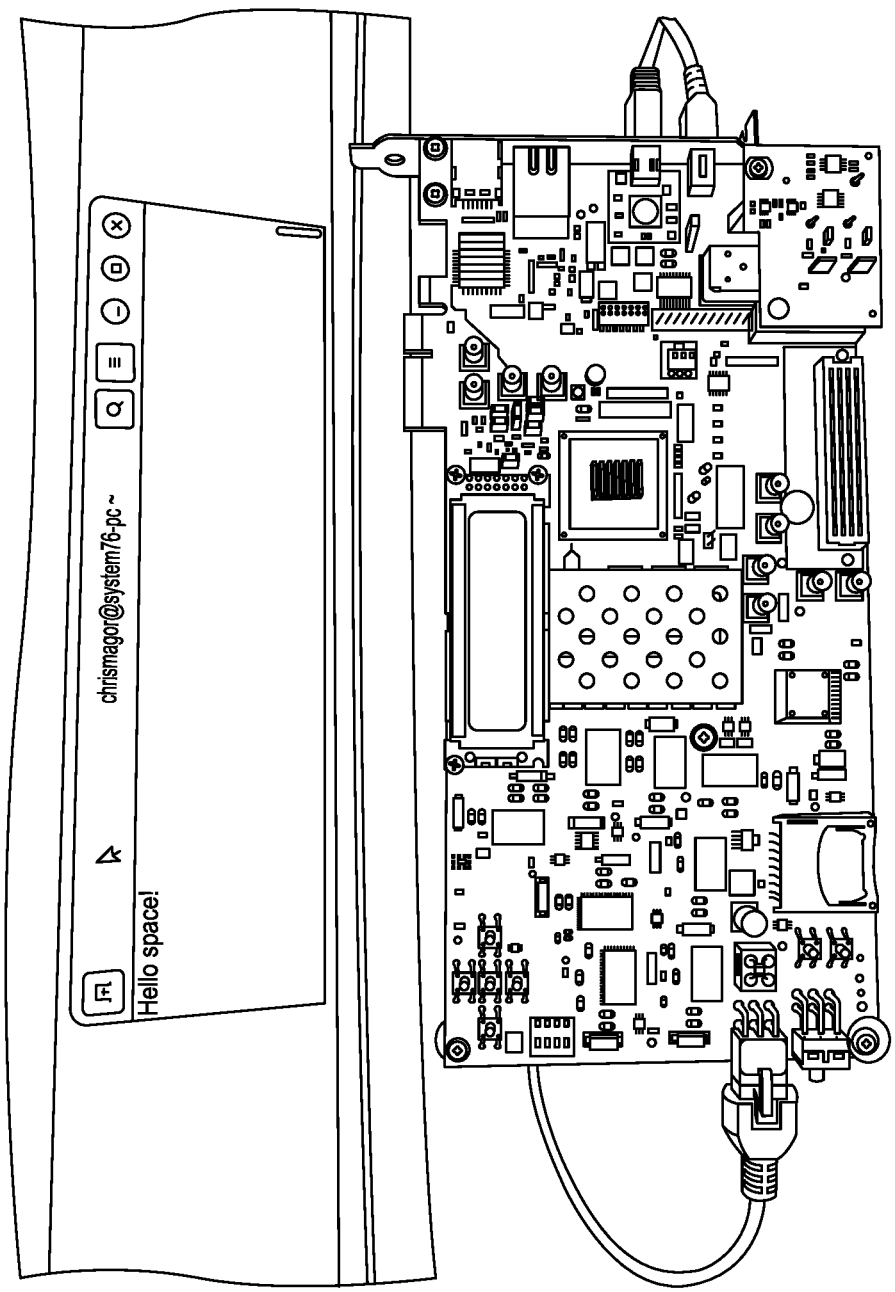
FIG. 12 is a photograph showing an AC701 board with a loaded test bitstream running test software used to test a computer device according to various embodiments of the present disclosure.

FIG. 12 shows the AC701 board, with the loaded test bitstream, running the test software. The bottom LEDs flash in accordance with the count program, displaying a binary value of the lower four bits. The serial port outputs the initialization message "Hello space!" in the Minicom terminal, accessing the communicated packet via a USB-to-UART bridge.

The clock rate for the computer system tested was 48 MHz, the fastest clock rate the board could support without extensive FPGA timing error resolution. As such, given the two clock cycles needed to complete a single RISC-V instruction, the tested computer system comes to 24 MIPS (Mega-Instructions Per Second). Given additional timing constraint management in the Vivado development suite, the clock speed of the Artix-7 could be brought to as high as 200 MHz in the RTL and, thus, demonstrate a performance of 100 MIPS.

For each of the above-described error correction/recovery mechanisms in the embodiment computer system 200, there are associated runtime costs. The first cost is in regards to time. As the computer system 200 is a synchronous design, no recovery mechanism is instantaneous and requires some time to identify and perform a repair. It is possible for multiple repair mechanisms to activate and overlap, however, most scenarios will only require one error correction mechanism to resume functionality. Table 4 describes possible SEE-induced fault types in the embodiment computing system 200, in relation to the recovery mechanism designed to address the fault type and the time range expected for recovery.

TABLE 4

| Fault Type | Recovery Mechanism | Component Repaired | Minimum Recovery Time | Maximum Recovery Time |
|---|---|---|---|---|
| Configuration Memory | SEM | Configuration Memory Word | 0.61 ms | 18.79 ms |
| Register Bit Flip | Arbiter | Faulted Register(s) in all 4 Tiles + Program Counters in all 4 Tiles | 2 clk cycles | 2 clk cycles |
| Program Counter Bit Flip | Arbiter | Program Counters in all 4 Tiles | 2 clk cycles | 2 clk cycles |
| IMEM Data Error | IMEM Scrubber | Faulted Value(s) at IMEM Address | 2 clk cycles | IMEM_SIZE/2 clk cycles |
| DMEM Data Error | DMEM Scrubber | Faulted Value(s) at DMEM Address | 2 clk cycles | DMEM_SIZE/2 clk cycles |
| Unresponsive Tile | Partial Reconfiguration | Faulted Tile Configuration Memory | 400 [ms] | 400 [ms] |
| Unresponsive System | Full Reconfiguration | Entire FPGA Configuration Memory | 6 s | 6 s |

These numbers were found by running simulations in Vivado using a VHDL testbench and evaluating the timing on a clock-by-clock basis in hardware. The design was then tested in physical hardware to confirm these readings. The FPGA device used was a Xilinx Artix-7 XC7A200T FPGA, set in both the simulation and the bitstream generation settings. The clock rate simulated was 48 MHz for the RTL simulations and hardware implementation. Both IMEM and DMEM devices are 4k (4096 bytes) and thus IMEM_SIZE and DMEM_SIZE are each 4096.

It should be noted that as the SEM has not been significantly modified from the last architectural implementation, its timing characterization is as referenced in the Xilinx SEM datasheet. Depending on where the SEM is currently iterating through configuration memory, relative to the site of an injected fault, an Artix-7 XC7A200T device will take anywhere from ms to 18.79 ms to identify, correct, and report the fault. This is dependent on the type of FPGA device and the SEM's input clock—in this case, 100 MHz.

Figure 13:
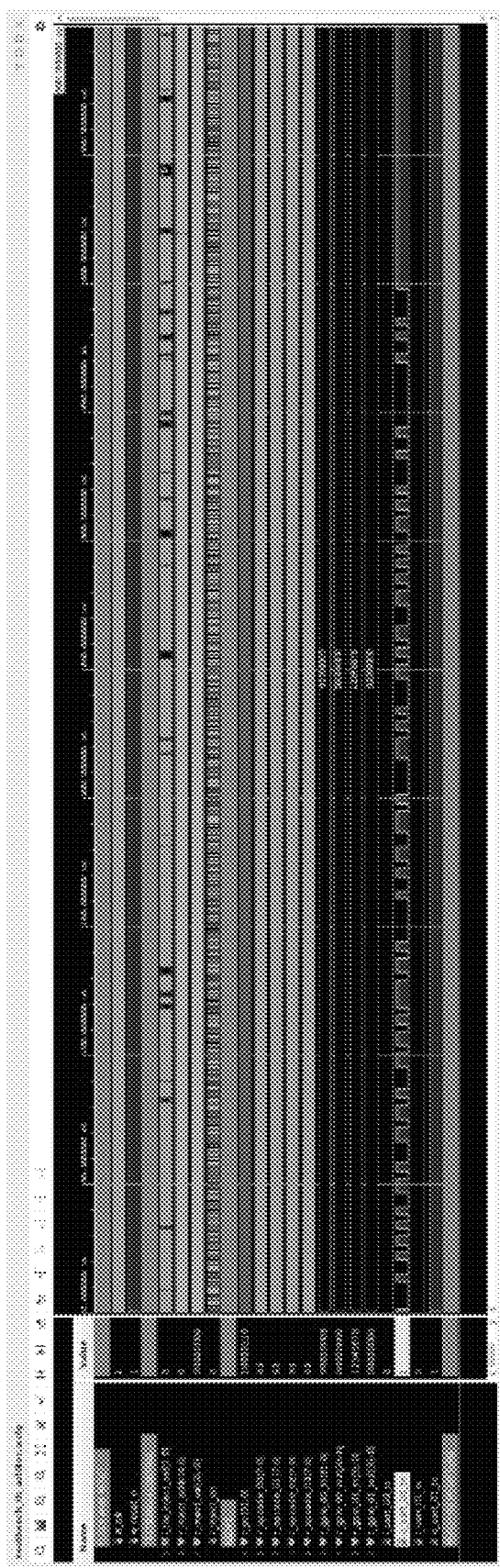
FIG. 13 is a screenshot illustrating an overview of an arbiter simulation.

The Arbiter was first simulated in Vivado using a dedicated error injection process in the test bench. Using random integer generation in non-synthesizable VHDL, a random register was selected for error injection at a random time, using an easily-identifiable 32-bit erroneous value (0xDEADBEEF) for easy identification of register damage. Within a simulation of 500 μs at a clock rate of 32 MHz, 701 errors were injected into the core and observed for recovery. FIG. 13 is a screenshot illustrating an overview of the Arbiter simulation, demonstrating that the full UART transmission of the initialization message is completed without interruption.

Figure 14:
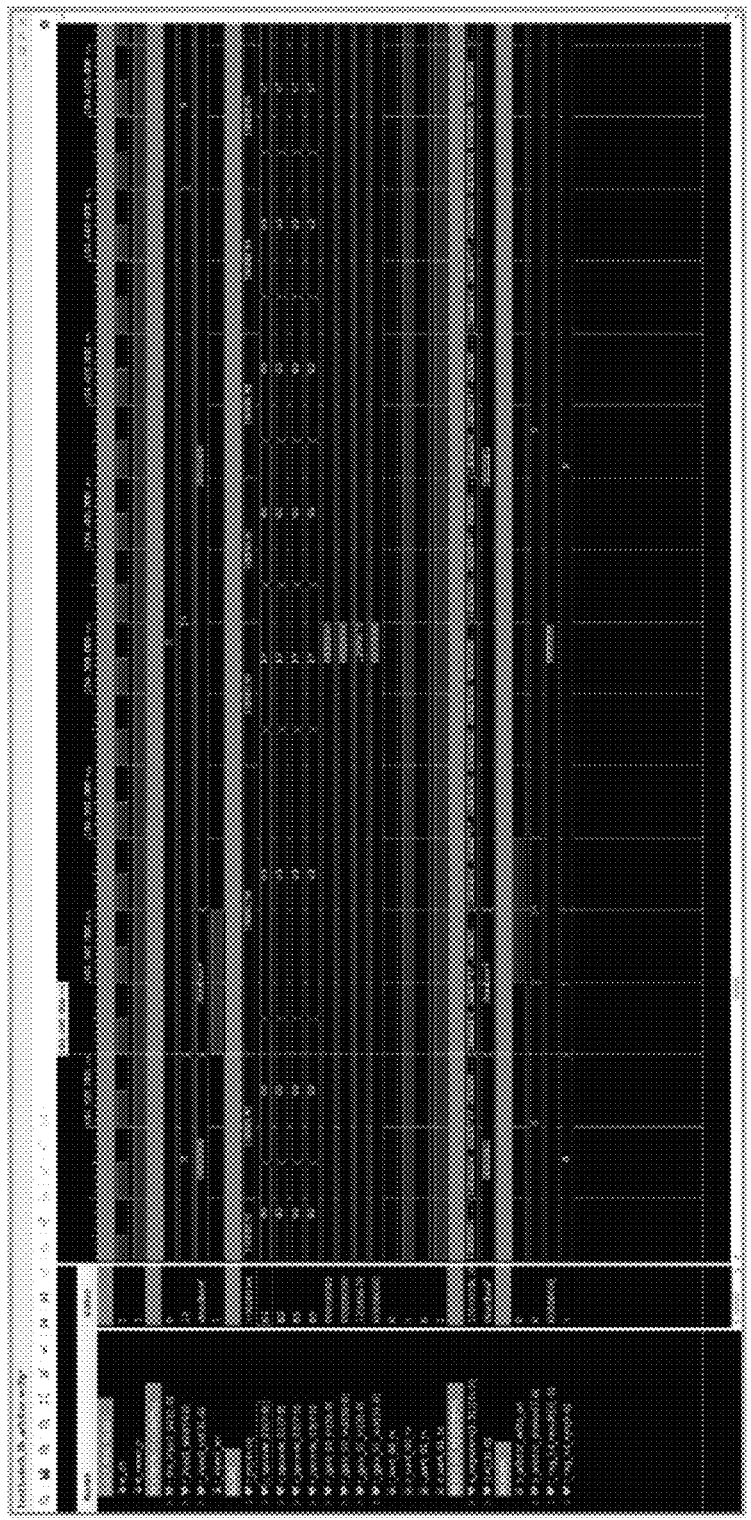
FIG. 14 is a screenshot illustrating a random error injection during an arbiter simulation.

FIG. 14 is a screenshot demonstrating one of the 701 random error injections, specifically for Tile 0, Register 14. This register, denoted "a4" in the RISC-V ISA, is a general-purpose register commonly used in ALU operations and temporary data handling. Before the error injection at 104.33 μs, its value is 0x00000001. After the injection is performed by the test bench, Tile 0's Register 14 is overwritten with 0xDEADBEEF and is therefore in disagreement with Tile 1, Tile 2, and Tile 3. The Arbiter catches this disagreement on the next clock cycle and forces all registers to be rewritten in all four tiles with the corresponding majority values. In this case, Register 14 in all four tiles is set to 0x00000001. This process includes the PC and results in a single paused instruction, ensuring all registers in the CPU end up with the same data when the Arbiter is finished.

The tile syndrome flag for Tile 0 is set to 1 while this process occurs, indicating that a disagreement has occurred. This flag is cleared when the repair is performed successfully, and the next clock cycle indicates that the values agree in the end. The detection is done in one clock cycle and the correction is completed in one clock cycle, regardless of which or how many registers are affected by faults. Thus, the minimum and maximum recovery time is 2 clock cycles.

It is possible for error resolution to fail if the multi-fault conditions mentioned in the Voter description are met. Given the spacing of the processor tiles in the FPGA, the probability of enough faults striking the registers to prompt multi-fault failure states is incredibly low.

Figure 15:
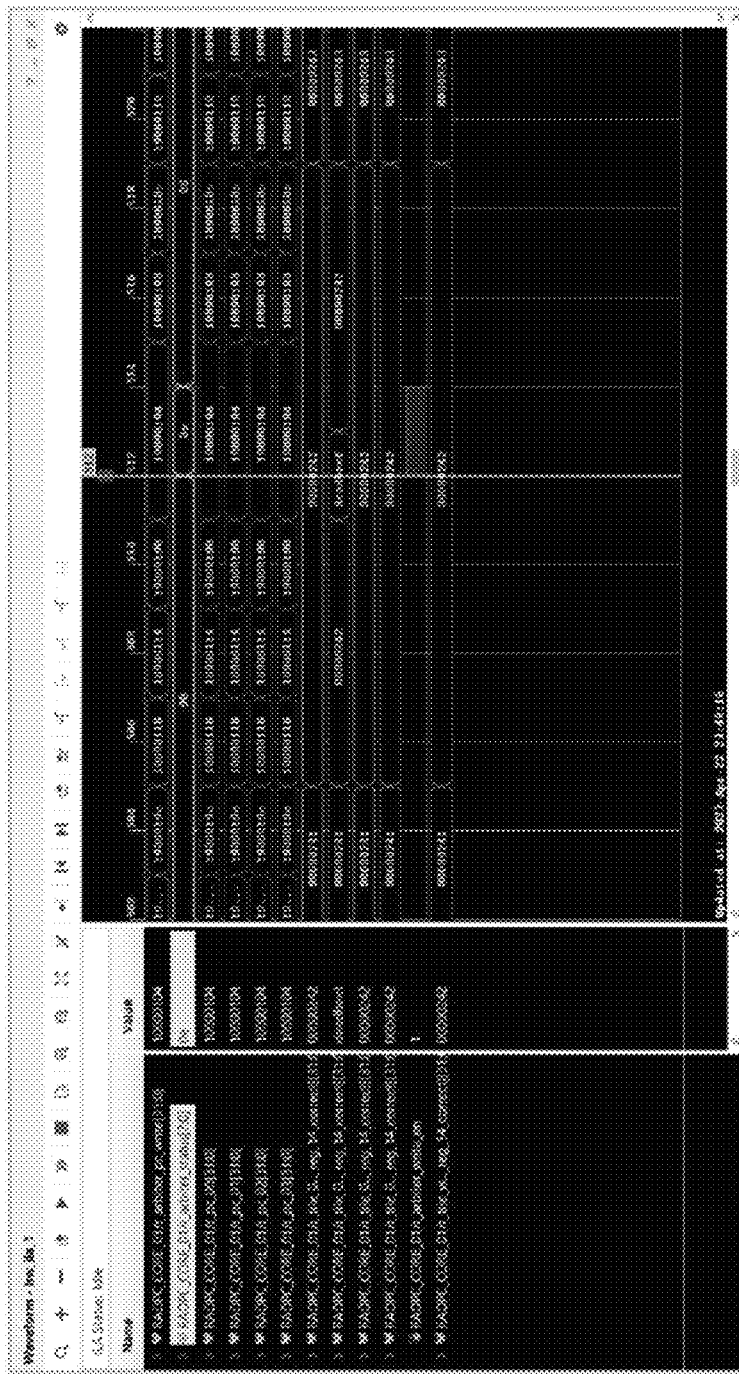
FIG. 15 is a screenshot illustrating the arbiter correcting an error during testing of a computer device according to various embodiments of the present disclosure.

FIG. 15 is a screenshot showing the arbiter correcting an error in register 14 on the AC701 board. Similar to the simulations, an error is detected in Tile 2, Register 14 when its register value (0xDEADBEEF) does not match the other tiles (0x0000242). The Arbiter status flag indicates multiple tile registers being repaired, though the limited ILA ports only indicate the signals corresponding to Register 14. The PC is held an extra clock cycle longer, thus the instruction at IMEM address 0x10000104 is paused for an extra cycle as all tile registers are refreshed. The write enable is cleared when the tiles report full agreement via the voter subcomponent.

Through this process, the AC701 board running the computer system 200 continued to operate the counter on the LED output and completed its UART transmission.

The memory scrubber was first simulated in Vivado, but it required a different means of error injection for testing. Adding another port for injecting errors into addresses within either the IMEM or DMEM devices would fundamentally change the RTL and thus compromise the test. Initializing one of the Tiles with erroneous contents, however, is a sufficient means of testing the scrubber's ability to resolve errors—albeit overly comprehensive. Within a simulation of 1000 μs at a clock rate of 32 MHz, all 4096 address spaces of Tile 0's IMEM were initialized with erroneous opcodes, causing a voting conflict with the other three tiles. When reset was disabled, the scrubber iterated through every memory address from 0 to 4096, incrementing by four and reading each bytewise word. Each read takes a single clock cycle and since each read is a bytewise word, reading the entire IMEM device takes 1024 clock cycles.

If a memory address conflicts with the other tiles, the voter component in the scrubber will enable write access to the IMEM and overwrite the address value with the correct voted value. This process requires a second clock cycle to complete before moving on to the next memory address. Thus, it takes 2 clock cycles minimum to correct a memory address, but if a worst-case scenario occurs and every single memory address is compromised, it takes 2 clock cycles per bytewise word to correct the entire memory device. Since the bytewise word size of the memory is a fourth of the overall memory size, the maximum time to correct the entire IMEM device is 2*(IMEM/4) clock cycles.

Figure 16:
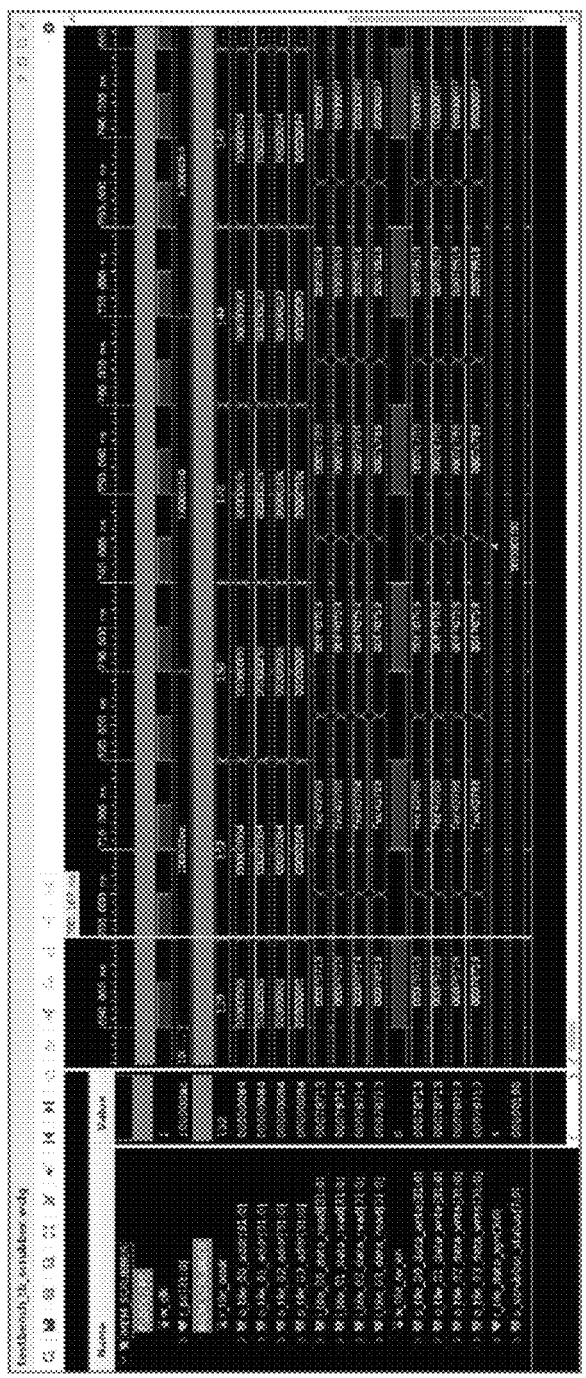
FIG. 16 a screenshot illustrating an overview of an instruction memory scrubber simulation.

FIG. 16 is a screenshot illustrating an overview of the IMEM Scrubber simulation, demonstrating several corrections of the Tile 0 IMEM addresses. The scrubber will continue to iterate through each address and check the memory device's contents, regardless of inerrant status. As such, this correction method is a background feature and does not stall general processor operations.

In this simulation, Tile 0's IMEM was configured with faulty values using a repurposed opcode obfuscation function. The original purpose of this function was to obfuscate the opcodes of a RISC-V architecture for cybersecurity purposes, but in the case of this test, was adapted to corrupt a single core's IMEM component with faulty opcodes. Thus, Tile 0 would start with a completely erroneous IMEM component and would fail to run opcodes correctly. As shown in the simulation screenshot, each address in IMEM was rewritten by the scrubber as it iterated through the IMEM device. Thus, the correct opcodes were rewritten to Tile 0. Given the various loops in the program, the scrubber quickly rewrote the IMEM device before later opcodes could be executed.

Figure 17:
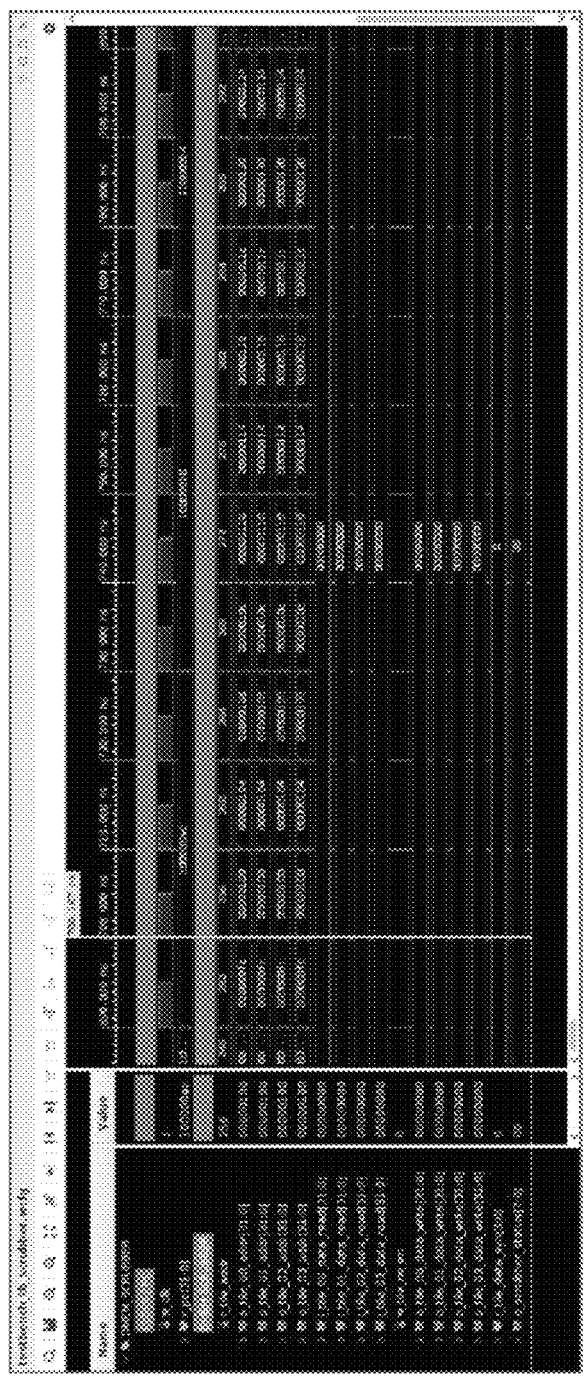
FIG. 17 a screenshot illustrating an overview of a data memory scrubber simulation.

The same scrubber was connected to the DMEM memory, which was left alone during simulation bitstream generation and did not start with corrupted data. This normal scrubber behavior is shown in FIG. 17.

The FPGA was configured with the corrupted Tile 0 IMEM opcodes, just like the simulations. The integrated logic analyzer (ILA) was set to trigger when the scrubber reported an error, which occurred shortly after configuration. The scrubber reads each cell of IMEM, recognizes an error through the voter component, enables a write at that address, and then moves on to the next address sequentially. It is important to note that an error in IMEM can result in corrupted or erroneous data perpetuating through the registers, ALU, and even memory writes, thus the Arbiter is always kept running so as to limit error propagation from the scrubbers. As the Arbiter can stall the processors for an additional clock cycle, it is not considered a background repair mechanism and so must be characterized as a potential source of delay.

Figure 18:
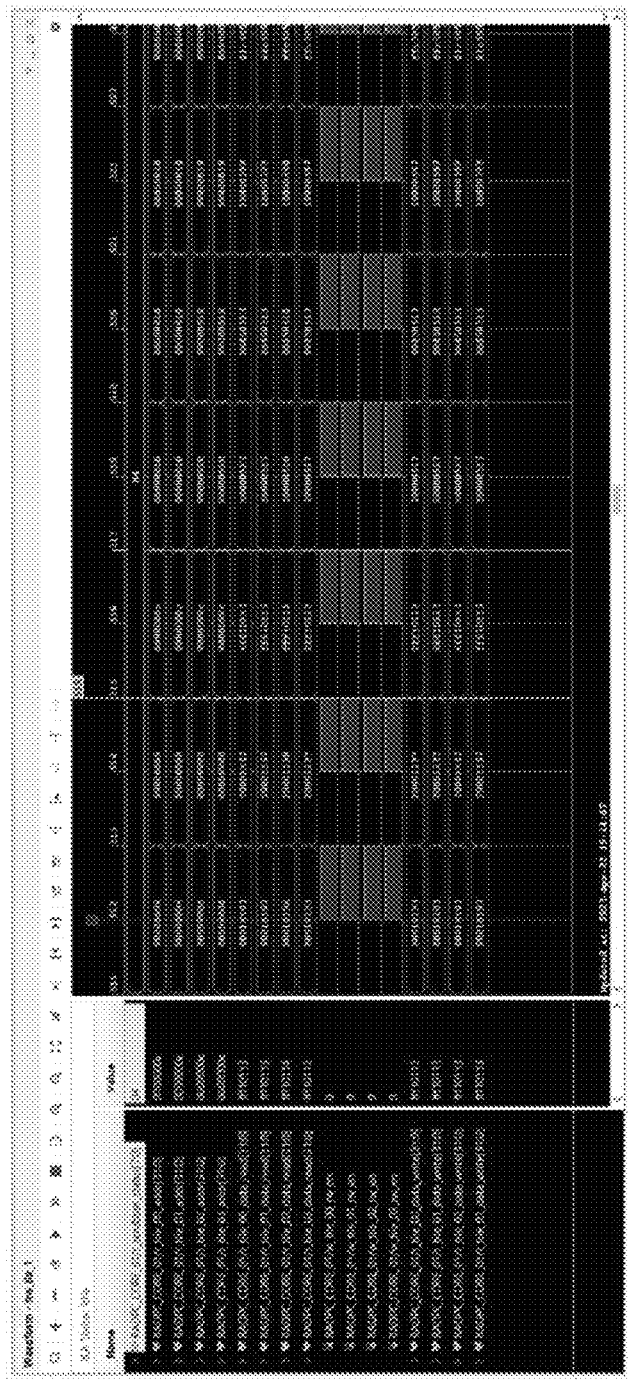
FIG. 18 is a screenshot showing an integrated logic analyzer (ILA) analysis of scrubber repair timings.

FIG. 18 is a screenshot showing an integrated logic analyzer (ILA) analysis of scrubber repair timings.

In terms of partial and full reconfiguration characterization, full reconfiguration (FR) took 6 seconds for the current AC701-specific bitstream to be loaded from a programming device onto the FPGA itself. This is fixed by the JTAG protocol and the Xilinx configuration tools used in testing, and is due to the large device size and the slow USB-to-JTAG speeds provided by the default programmer. While this is a worst-case-scenario error mitigation strategy, the delay presents a significant cost to repairing the computer system 200. However, given that FR is to be used in scenarios where no other recovery strategies are effective, this cost is acceptable in context of a failed system. Switching to a smaller FPGA device and using a faster means of bitstream configuration could allow for faster FR recoveries.

Partial reconfiguration times are proportional to the size of the PR region relative to the rest of the device, thus the computer system 200 takes about 400 milliseconds for the current AC701-specific configuration. This can be tuned to a quicker recovery time by further constraining the size of the PR region and removing elements that do not require redundant error mitigation. Memory devices do not need to be reconfigured, for example, as both IMEM and DMEM contents can be corrected by the scrubber.

As the Arbiter 207 can repair the registers in a partially-reconfigured tile when it is brought back online, including a refreshing of the program counter. This eliminates the requirement in related systems for delays and checkpoints in the runtime, thus relegating PR to a background means of recovery. Where architectures of related systems required software checkpoints to synchronize repaired processors, thus taking significant amounts of time to perform a recovery in the processor, the architecture of the embodiment computer system 200 may significantly cut down the repair time by allowing the system to continue operation while a tile is reconfigured.

Previous architecture analysis of related systems have used Markov chain models to estimate system reliability under threat of induced faults. A Markov model describes a system as it transitions between different modes of operation, using a state diagram. The links represent the probabilities of transitioning from one state to another, depending solely on the current state.

In the context of an embodiment computer system 200, the Markov model represents an instance of an SEE in the architecture. This accounts for SEEs that cause faults and those that have no effect on the system, so the fault rate is scaled to account for the probability of a strike affecting a critical region of the FPGA itself. Xilinx's Vivado development suite reports on essential bits in the FPGA, allowing the area that can be affected to be evaluated as a ratio of the overall area. Thus, the probability of a fault compromising a section of the system is considered in terms of the area of the FPGA that is occupied by sensitive logic.

Figure 19:
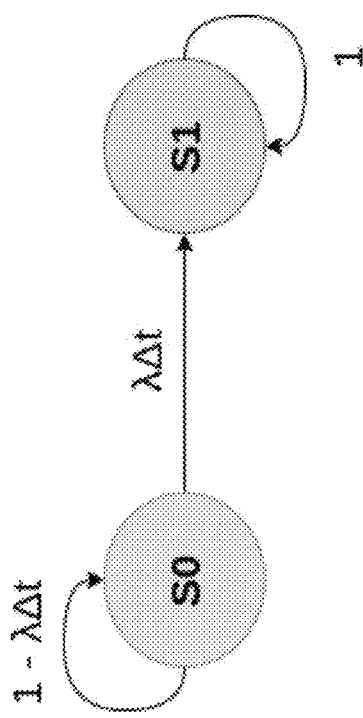
FIG. 19 is a schematic illustration of a Markov chain model of a system including distinct states $S_0$ and $S_1$.

A Markov chain model is mathematically represented by a transition matrix of size (m, n), where the probability of transitioning from state m to state n is represented by an entry. For example, FIG. 19 schematically illustrates a system with two distinct states $S_0$ and $S_1$. In this instance state $S_0$ represents the state of an operational system and state $S_1$ represents the state of a faulted system. Each probability is described algebraically in reference to time $\Delta t$ and fault rate $\lambda$.

To mathematically represent transitioning between S states (or remaining within a state), a transition matrix T of size S×S is used. This matrix encapsulates all probabilities of all transitions t from one state m to another state n, as shown in Equation 1:

$$T(m, n) = \begin{bmatrix} t_{1,1} & \cdots & t_{1,n} \\ \cdots & \cdots & \cdots \\ t_{m,1} & \cdots & t_{m,n} \end{bmatrix} \quad \text{(Eq. 1)}$$

The transition matrix T of the two-state diagram in FIG. 19 is shown in Equation 2:

$$T(m, n) = \begin{bmatrix} 1 - \lambda \Delta t & \lambda \Delta t \\ 0 & 1 \end{bmatrix} \quad \text{(Eq. 2)}$$

As the goal of a Markov model is to characterize state transitions, Equation 3 is a matrix dot multiplication used to calculate the probability p of existing in state S given a time step k.

$$p_s(t = k\Delta t) = [p_0(0) \ \ldots \ p_n(0)] \cdot \begin{bmatrix} t_{1,1} & \cdots & t_{1,n} \\ \cdots & \cdots & \cdots \\ t_{m,1} & \cdots & t_{m,n} \end{bmatrix}^k \quad \text{(Eq. 3)}$$

The probability of residing in state S after a time step k, p s for the two-state diagram in FIG. 19 is shown in Equation 4:

$$p_s = (t = k\Delta t) = [p_0(0), p_1(0)] \cdot [_0{}^{1-3\lambda\Delta t} {}_1{}^{\lambda\Delta t}]^k \quad \text{(Eq. 4)}$$

The reliability is the probability of residing in a state other than state S and is described by Equation 5:

$$R(t) = 1 - p_s(t = k\Delta t) \quad \text{(Eq. 5)}$$

Finally, the Mean Time To Failure (MTTF) is defined as the point in time t when the reliability of the system R(t)=0.5. This is a common metric used to evaluate how well a system will perform in terms of the time until proper function is no longer possible.

Figure 20:
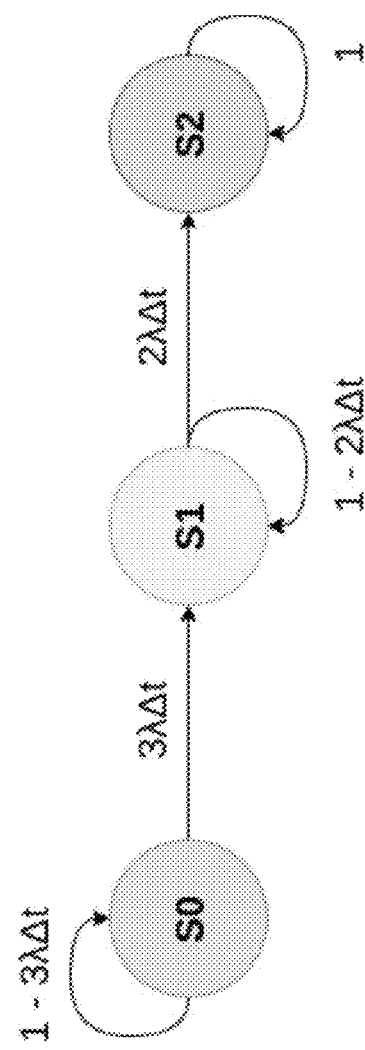
FIG. 20 illustrates the state diagram for a computer system having triple modular redundancy (TMR).

To apply the principles of Markov chain modeling to space computing, a simple TMR system must be considered. FIG. 20 shows the state diagram for this system. State $S_0$ is the state for a fully operational system, where none of the three modules have experienced faults. State $S_1$ is the state where one module has been faulted and therefore its vote compromised. A majority value, however, is still possible due to the two remaining modules, but return to the fully operation state is now impossible. Last, State $S_2$ is the state where a majority vote is no longer possible due to two or more faulted modules. Return to either state is impossible due to the lack of repair mechanisms. A fault rate of $\lambda$=0.001 [SEU/µs] is used for all models presented and was chosen based on previously performed analyses.

The corresponding transition matrix describing this TMR system is in Equation 6:

$$T(m, n) = \begin{bmatrix} 1 - 3\lambda\Delta t & 3\lambda\Delta t & 0 \\ 0 & 1 - 2\lambda\Delta t & 2\lambda\Delta t \\ 0 & 0 & 1 \end{bmatrix} \quad \text{(Eq. 6)}$$

The probability of this TMR system remaining in an operational state is given as a function of the individual reliabilities of each state. This is shown in Equation 7:

$$R(t) = R^3(t) + 3R^2(t) \cdot (1 - R(t)) = 3R^2(t) - R^3(t) \quad \text{(Eq. 7)}$$

Figure 21:
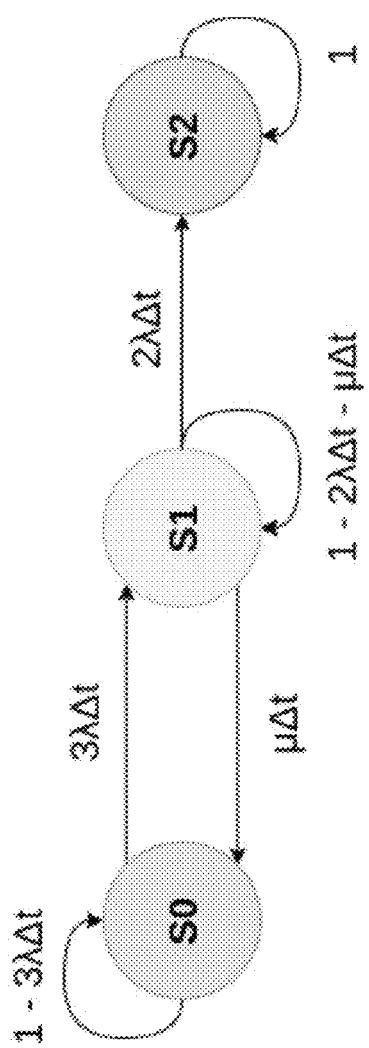
FIG. 21 illustrates the state diagram for a computer system having TMR with repair capability.

As seen from the subtraction of a larger-power polynomial, the probability of a TMR system remaining operational as t increases decreases rapidly. This corresponds to the TMR system's inability to repair itself or correct faulted modules, meaning failure is an inevitability defined primarily by the time it takes to fault at least two modules. Previous space computing architectures have recognized the importance of repair capability in increasing the reliability, and therefore MTTF, of a system. As these systems have used methods such as PR or SEM techniques within FPGAs, more state changes must be represented in the state diagram. A new parameter µ is added to represent the repair rate of a module in the most extreme fault rate scenario. FIG. 21 represents the updated state diagram of this system and Equation 8 represents the transition matrix for this model:

$$T(m, n) = \begin{bmatrix} 1 - 3\lambda\Delta t & 3\lambda\Delta t & 0 \\ \mu\lambda\Delta t & 1 - 2\lambda\Delta t - \mu\lambda\Delta t & 2\lambda\Delta t \\ 0 & 0 & 1 \end{bmatrix} \quad \text{(Eq. 8)}$$

The previous RadPC architecture extended this functionality, and therefore the reliability and MTTF, through a 4MR module configuration with its processors. This results in the addition of two states and six more transitions, thus further reducing the decrease in reliability and MTTF as time increases. For this model, the assumption is made that two concurrent faults will not result in an irreparable multi-fault condition, as the probability of such a fault is low enough to be considered impractical. In this model, µ=437 ms to represent the slowest possible tile PR time.

Figure 22:
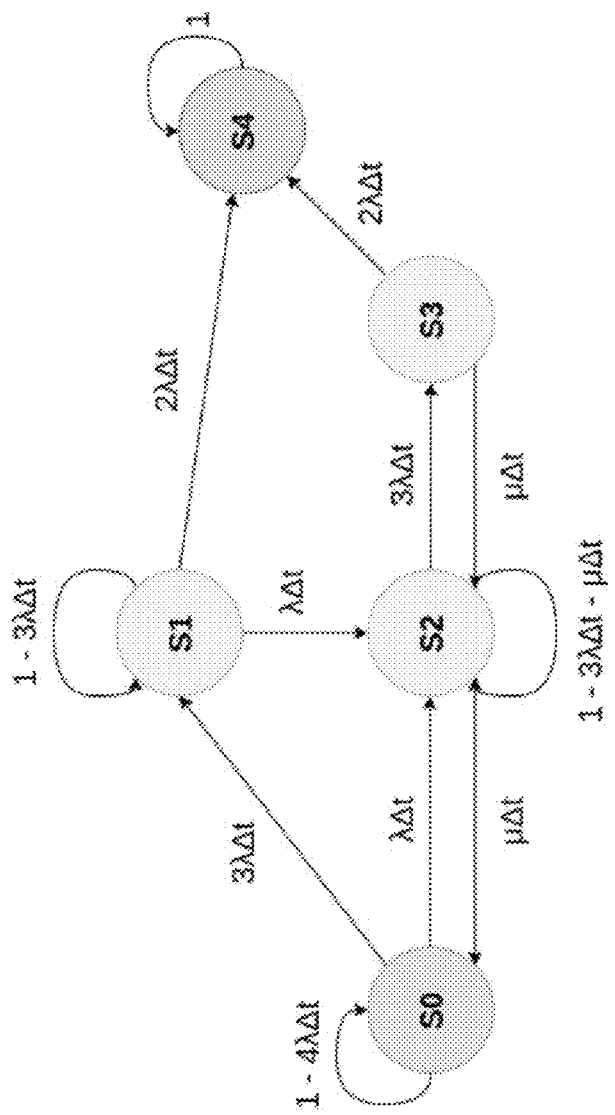
FIG. 22 illustrates the state diagram for a computer system having four-modular redundancy (4MR) with repair capability.

Similar to the standard TMR system, $S_0$ represents a fully operational state for RadPC. If a processor tile is damaged, the system transitions to $S_1$ and awaits repairs. This tile must be disregarded in the vote process until it is brought back into operation, represented by $S_2$. If repairs are not successfully conducted, RadPC will continue in $S_3$ until repairs are completed. If RadPC experiences enough irreparable faults that compromise the voting and repair mechanisms, the system transitions to $S_4$—total and irrecoverable system failure. FIG. 22 is the state diagram that represents this model and Equation 9 is the transition matrix:

$$T(m, n) = \begin{bmatrix} 1-4\lambda\Delta t & 3\lambda\Delta t & \lambda\Delta t & 0 & 0 \\ 0 & 1-2\lambda\Delta t - \lambda\Delta t & \lambda\Delta t & 0 & 2\lambda\Delta t \\ \mu\lambda\Delta t & 0 & 1-3\lambda\Delta t - \mu\lambda\Delta t & 3\lambda\Delta t & 0 \\ 0 & 0 & \mu\lambda\Delta t & 1-2\lambda\Delta t & 2\lambda\Delta t \\ 0 & 0 & 0 & 0 & 1 \end{bmatrix} \quad \text{(Eq. 9)}$$

The computer system 200 according to various embodiments of the present disclosure includes several important changes to this model. First, PR is no longer considered a time-based repair mechanism—a tile undergoing partial reconfiguration is relegated to the background and does not affect the rest of the system as it is refreshed. The only repair mechanism that can affect the other tiles during runtime is the Arbiter, in which a 2 clock cycle delay is required to switch states and complete the repair. For a 48 MHz clock on an embodiment computer system 200, the repair time comes to 41.7 ns. Effectively, the only change to the Markov chain model is the value of the variable R. This results in a reduced drop in reliability over time and a far greater runtime in operational form.

Radiation environments in space are not constant and can affect devices differently depending on relative location and time. Related computer systems have undergone testing in space environments, but on the grounds of a preliminary analysis of the fault types and rates anticipated. Simulation software and suites are often used to perform such analysis. Related computer systems have used a numerical modeling tool known as the Cosmic Ray Effects on Micro-Electronics code (CREME96). These results parallel the presented architecture and demonstrate the expected environments in which it will be expected to perform. A similar FPGA, the Artix-7 XC7A35T chip, was used in this analysis as a test case of the sort of device to be implemented. Its dimensions and essential bit count were factored into the CREME96 analysis. From this information, estimates were calculated by the software to predict the intensity and frequency of SEEs expected to be experienced by the device during operation. As anticipated International Space Station missions were set around the time of the initial CREME96 analysis, these environments were selected for analysis by the software. The first analysis assumed the entire FPGA to be essential for base operation. Table 5 demonstrates the results of this simulation for the International Space Station environment. Assuming the FPGA does not use the entirety of its configuration memory for implementation, and derating these figures as one would for a standard microcontroller in a space environment, the fault rates must be scaled by a factor of 0.3. The reduction in rates is reflected in the same table. These values are a closer representation of the effects of the radiation environment on a standard space computing system.

TABLE 5

| Standard FPGA Area | | | |
|---|---|---|---|
| ISS Environment, Stormy Solar Conditions | device/day | ISS Environment, Stormy Solar Conditions | device/day |
| Average | 1179.700 | Average | 6192.300 |
| Peak | 2232.800 | Peak | 11721.700 |
| ISS Environment, Quiet Solar Conditions | device/day | ISS Environment, Quiet Solar Conditions | device/day |
| Average | 29.046 | Average | 152.470 |
| Peak | 82.695 | Peak | 434.109 |
| ISS Environment, Worst Case Scenarios | device/day | ISS Environment, Worst Case Scenarios | device/day |
| Worst Week | 9939.990 | Worst Week | 52182.500 |
| Worst Day | 54377.500 | Worst Day | 285468.000 |
| Worst 5 Minutes | 207490.000 | Worst 5 Minutes | 1089270.000 |
| 30% Processor Derating | | | |
| ISS Environment, Stormy Solar Conditions | device/day | ISS Environment, Stormy Solar Conditions | device/day |
| Average | 353.910 | Average | 1857.690 |
| Peak | 669.849 | Peak | 3516.510 |

TABLE 5-continued

| ISS Environment, Quiet Solar Conditions | device/day | ISS Environment, Quiet Solar Conditions | device/day |
|---|---|---|---|
| Average | 8.714 | Average | 45.741 |
| Peak | 24.809 | Peak | 130.233 |

| ISS Environment, Worst Case Scenarios | device/day | ISS Environment, Worst Case Scenarios | device/day |
|---|---|---|---|
| Worst Week | 2981.997 | Worst Week | 15654.750 |
| Worst Day | 16313.250 | Worst Day | 85640.400 |
| Worst 5 Minutes | 62247.000 | Worst 5 Minutes | 326781.000 |

Figure 23:
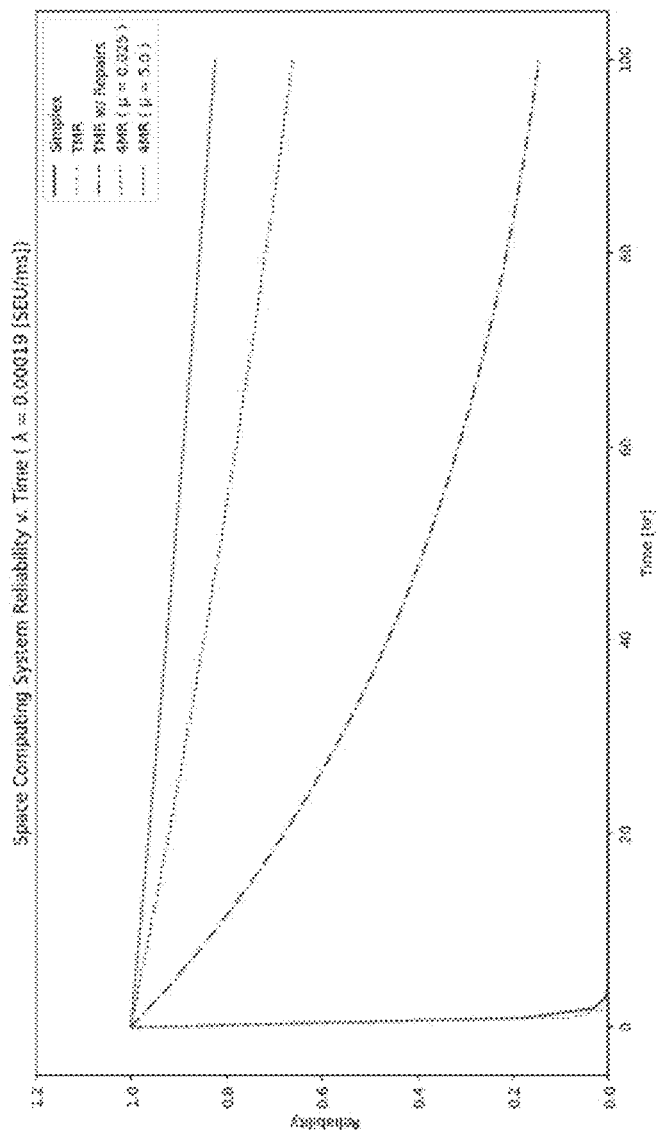
FIG. 23 is a plot showing the reliability of various computer systems over time at a given fault rate.
Figure 24:
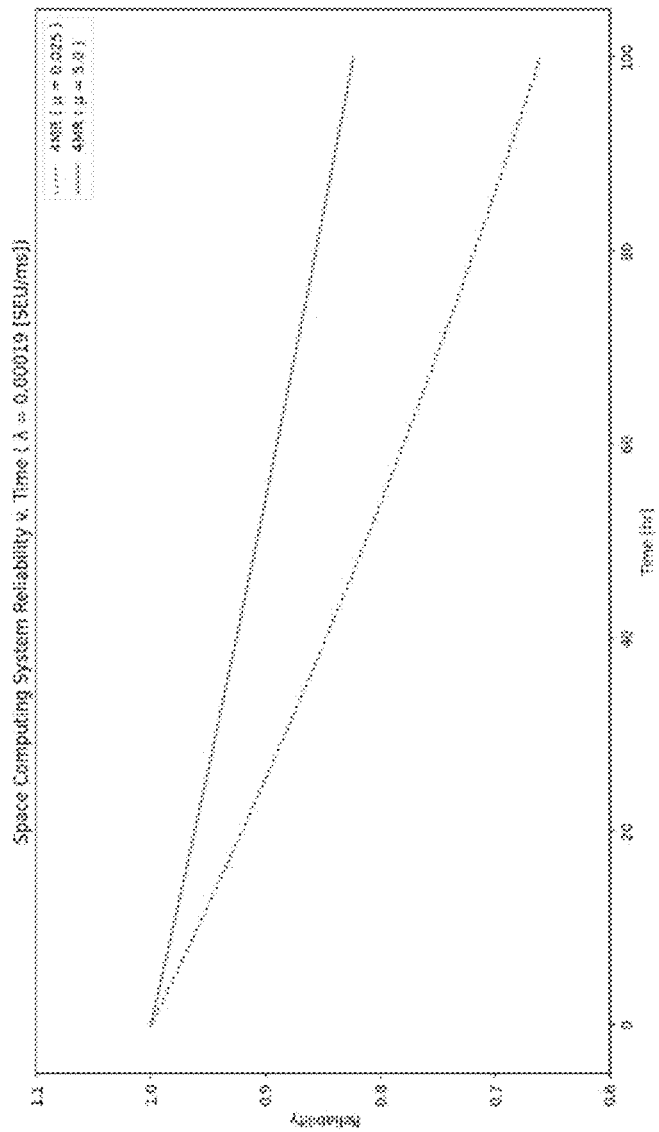
FIG. 24 is a plot showing the reliability of 4MR computer systems having different repair rates over time at a given fault rate.

Given the radiation rates presented in the CREME96 data, in terms of SEUs per day, a plot showing the reliability of the various computing systems over time at a given fault rate $\lambda$ can be constructed. Such a plot is given in FIG. 23, given the fault rate of the worst expected day on the International Space Station. This simulation was performed for 100 hours, a general "rule of thumb" duration for aerospace runtimes. The simplex and TMR systems fail quickly due to their inabilities to repair themselves in hostile radiation environments. Greater reliability is demonstrated in the TMR system with repair capabilities, though the reliability is heavily compromised by the end of the 100 hours. The 4MR system, however, demonstrates far less decrease in reliability. As can be seen from the purple dotted and light-blue dashed lines on the plot, decreasing the repair time of the system (and thus increasing the $\mu$ ratio) greatly decreases the reliability drop-off of the system significantly. To aid in readability, another plot highlighting these two repair systems is shown in FIG. 24. When the reliability reaches 0.5 or below, the probability of a system failing is that of a coin flip and is considered unsuitable for operations. The MTTF rate illustrates the effect of this reliability on a system at any fault rate k, and with the worst-case scenario fault rates for the International Space Station is provided by CREME96, further analysis can be conducted as a means of understanding the effects of fault rates on the system. In conjunction with the Markov chain model reliability analysis, a script was written in Python to determine the MTTF of each computing system in the worst-case International Space Station radiation environments. Table 6 shows the results of this simulation analysis.

TABLE 6

| | ISS Environment | | |
|---|---|---|---|
| | Worst Week ($\lambda = 0.000035$ SEU/ms) | Worst Day $\lambda = 0.00019$ SEU/ms) | Worst 5 Minutes $\lambda = 0.00072$ SEU/ms) |
| Simplex System | 0.02 hr | 0.004 hr | 0.0012 hr |
| TMR | 0.02 hr | 0.004 hr | 0.0012 hr |
| TMR w/ Repair | 10.7 hr | 0.36 hr | 0.0257 hr |
| 4MR ($\mu = 0.025$) | 88.8 hr | 1.69 hr | 0.0523 hr |
| 4MR ($\mu = 5.0$) | 107.8 hr | 3.6 hr | 0.2484 hr |

Figure 25:
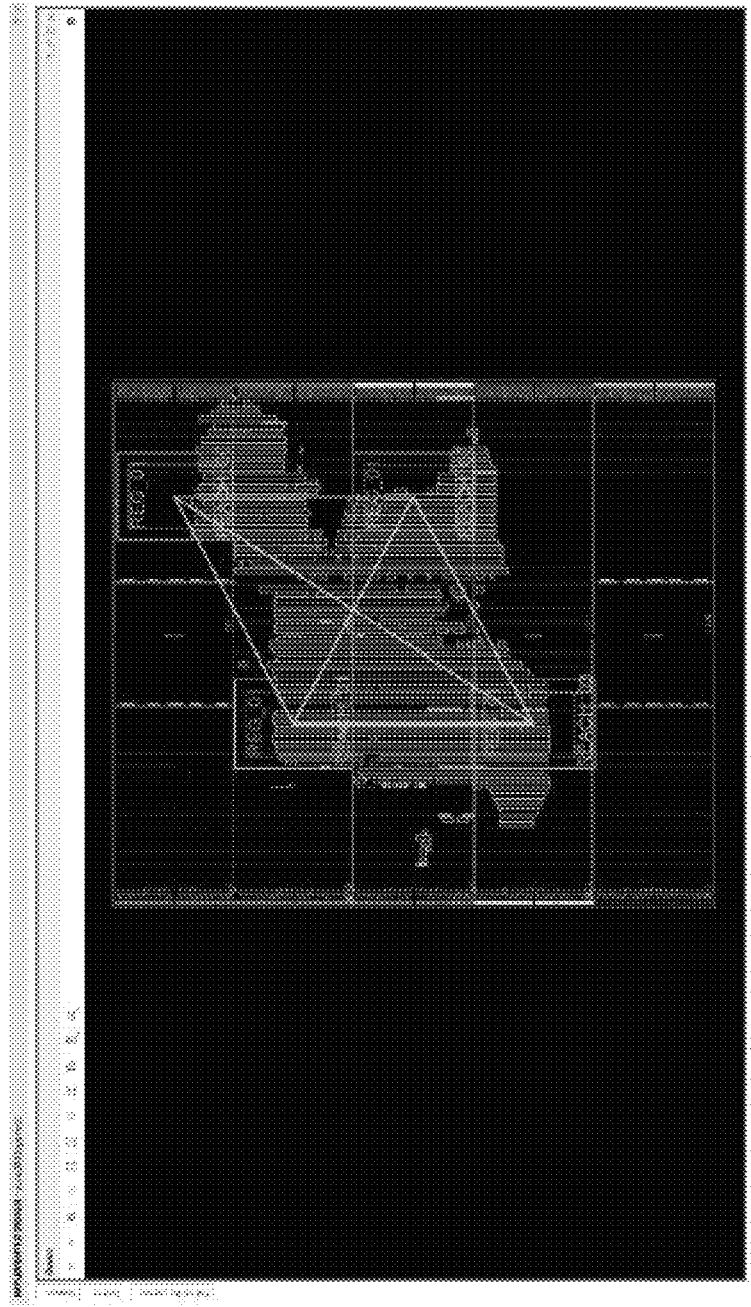
FIG. 25 illustrates the floorplan of an FPGA with different processing cores spread out in the FPGA design.

It was found that the 4MR system with the increased value of $\mu=5.0$ lasts 121% as long as the 4MR system with $\mu=0.025$ during the International Space Station's worst possible estimated radiation in a week, 213% as long during the worst possible day, and 500% as long during the worst possible five minutes. These systems last substantially longer in more extreme radiation environments than the simplex or TMR systems. It is shown here that $\mu$, representing a ratio of faster repair times, greatly affects the MTTF of the system given a fault rate. Additional Markov modeling may be conducted incorporating the background repair natures of PR and memory scrubbing, but as such features greatly extend the size of the Markov chain model and, therefore, the transition matrix probabilities, such complexity places these models outside the scope of this disclosure. The Markov chain models provided demonstrate the role of faster repair rates (and therefore higher $\mu$ ratios) in the reliability and MTTF of a computing system. It should be noted that this analysis was conducted on a smaller FPGA with more tightly clustered LUT and FPGA block memory (BMEM) placement. The FPGA used in the test hardware is a bigger device that, if floor planned ineffectively, could result in more devastating effects from SEEs. Thus, it may be advantageous to minimize "clustering" of sensitive logic by floor planning sensitive regions apart from each other. In some embodiments, regions of the respective Reach processing cores 202 may be "spread out" in the FPGA design. One example of this is shown in FIG. 25.

Because computer systems 200 according to various embodiments operate on the basis of majority voting indicating correct data, the Reach processing cores 202 may be physically spread out from one other so as to reduce the likelihood of multiple faults occurring between tiles and their corresponding interfaces. This may reduce the chances of a fault of any intensity corrupting two processor tiles beyond repair with a simultaneous hit, given the spread of RTL and area of effect of an SEE. As with other strategies, this comes as a balance between separating sensitive logic regions and meeting timing requirements so as to limit clocking violations. Furthermore, extending the floor planning of regions to other components such as the voter subcomponents, the Arbiter, and the scrubber may also prove beneficial. Thus, the physical placement of components of the computing system 200 within the FPGA may be another significant factor in increasing the MTTF of the device and reducing the impact of faults.

Embodiments of the present disclosure provide a novel approach to fault tolerance in space computing systems. Various embodiment computer systems 200 may utilize the open-source RISC-V architecture and newly-developed components to mitigate the effects of radiation, including radiation that is encountered in space. This approach may result in an upgraded form of radiation-tolerant space computing architecture, and may provide high-performance, radiation-resistant computing systems for spacecraft. Various embodiments may provide reduced repair times and greater performance under fault conditions, increasing the reliability of the system significantly and reducing mean time to failure. In some embodiments, by eliminating blackbox FPGA components and substituting glassbox substitutes in their place, providing access to key internal signals within the design may be possible and may therefore allow for more thorough detection of faults. In various embodiment, a glassbox processor core based on the RISC-V architecture may be implemented as a processing core for a radiation-resistant computer system 200. The core may be implemented in an FPGA and may include a custom-built, GCC-based compiler toolchain to support the implementation of a C program into VHDL. The computer system 200 may implement new components, such as an above-described Arbiter 207 and memory scrubber(s) 205, 206 that may each include voter components to provide expanded functionality to cover more of the critical areas of operation of the computer system 200. In various embodiments, the internal registers may be monitored and arbitrated by the Arbiter 207, using an array of voter components to monitor all registers and the program counter for radiation-induced faults. In addition, the memory scrubber(s) 205, 205 may leverage the voter sub-components and turn the task of memory scrubbing into a background operation. Previously used techniques with extensive flight heritage, such as partial/full reconfiguration and soft error mitigation, may also be utilized as a further means of background fault resilience. Finally, a reliability analysis of this new architecture was conducted using Markov chain models to demonstrate increased resilience. Where traditional triple-modular redundant systems can lead to inescapable failure states and repair mechanisms merely delay such system failure, a four-modular redundant structure in accordance with some embodiments may greatly extend the mean time to failure and maintain high reliability for a longer duration. Various embodiments may help to meet the growing needs for reliable, high-performance, radiation-tolerant space computing systems, both in present and near-future space exploration missions and beyond.

Although the foregoing refers to particular embodiments, it will be understood that the disclosure is not so limited. It will occur to those of ordinary skill in the art that various modifications may be made to the disclosed embodiments and that such modifications are intended to be within the scope of the disclosure. Compatibility is presumed among all embodiments that are not alternatives of one another. The word "comprise" or "include" contemplates all embodiments in which the word "consist essentially of" or the word "consists of" replaces the word "comprise" or "include," unless explicitly stated otherwise. Where an embodiment using a particular structure and/or configuration is illustrated in the present disclosure, it is understood that the present disclosure may be practiced with any other compatible structures and/or configurations that are functionally equivalent provided that such substitutions are not explicitly forbidden or otherwise known to be impossible to one of ordinary skill in the art. All publications, patents and patent applications referred to herein are incorporated by reference in their entirety to the same extent as if each individual publication, patent or patent application was specifically and individually indicated to be incorporated by reference in its entirety.

The invention claimed is:

1. A fault-tolerant computer system, comprising:
a plurality of processors configured to simultaneously execute identical sets of processor-executable instructions, each of the plurality of processors comprising a processor core comprising one or more registers and a local memory;
an arbiter configured to read each of the registers of the plurality of processors, detect incorrect register values, and overwrite registers containing the incorrect register values with corrected register values; and
a memory scrubber configured to read each address of the local memories of the plurality of processors, detect incorrect memory values, and overwrite addresses containing the incorrect memory values with corrected memory values.

2. The fault-tolerant computer system of claim 1, wherein the computer system is implemented using one or more field programmable gate arrays (FPGAs).

3. The fault-tolerant computer system of claim 2, wherein each of the processors comprises a glassbox softcore processor utilizing an open-source instruction set architecture.

4. The fault-tolerant computer system of claim 3, wherein each of the processors comprises a RISC-V softcore processor.

5. The fault-tolerant computer system of claim 1, wherein each processing core further comprises a program counter (PC), wherein the arbiter is configured to read and overwrite program counter values in each of the processing cores.

6. The fault-tolerant computer system of claim 5, wherein each processing core comprises backdoor ports to permit the arbiter to read and overwrite program counter values and register values in the respective processing cores.

7. The fault-tolerant computer system of claim 1, wherein:
the arbiter further comprises a voter subcomponent that is configured to detect incorrect register values based on a voting disagreement between register values from the plurality of processors; and
arbiter is configured to read and vote on the register values from the plurality of processors during every instruction cycle of the plurality of processors.

8. The fault-tolerant computer system of claim 7, wherein the arbiter does not use a software checkpoint-based voting system.

9. The fault-tolerant computer system of claim 1, wherein the local memory of each processor comprises instruction memory (IMEM) and data memory (DMEM), and the memory scrubber is configured to read each address of the IMEM and the DMEM of the plurality of processors, detect the incorrect memory values, and overwrite addresses containing the incorrect memory values with the corrected memory values.

10. The fault-tolerant computer system of claim 9, wherein the memory scrubber further comprises a voter subcomponent that is configured to detect the incorrect memory values based on a voting disagreement between memory values from the plurality of processors.

11. The fault-tolerant computer system of claim 10, wherein the memory scrubber component is configured to access the IMEM and the DMEM of each processor by accessing full words at a time.

12. The fault-tolerant computer system of claim 10, wherein each processor comprises a memory map that provides backdoor access to the memory scrubber to permit the memory scrubber to read and overwrite memory values in the IMEM and the DMEM of the respective processor.

13. The fault-tolerant computer system of claim 10, wherein the memory scrubber is configured to iteratively access each memory address of the IMEM and the DMEM of each processor and correct erroneous memory values as a background process while the plurality of processors execute the identical sets of processor-executable instructions.

14. The fault-tolerant computer system of claim 1, further comprising a soft error mitigation (SEM) controller configured to read and correct configuration memory of each processor of the plurality of processors.

15. The fault-tolerant computer system of claim 1, wherein the computer system is configured to perform a partial reconfiguration (PR) of the processor core of a first processor of the plurality of processors while the remaining processors continue to execute the identical sets of processor-executable instructions.

16. The fault-tolerant computer system of claim 15, wherein the computer system is configured to perform a full reconfiguration (FR) of all the processor cores of the plurality of processors.

17. The fault-tolerant computer system of claim 16, wherein during the PR or the FR, the local memory of each processor is left alone to be corrected by the memory scrubber.

18. The fault-tolerant computer system of claim 1, wherein the plurality of processors comprises four processors.

19. A method of operating a fault-tolerant computer system, comprising:

simultaneously executing identical sets of processor-executable instructions on a plurality of processors, wherein each of the plurality of processor comprises a processor core comprising one or more registers and a local memory;

reading each of the registers of the plurality of processors, detecting incorrect register values, and overwriting the registers containing the incorrect register values with corrected register values; and reading each address of the local memories of the plurality of processors, detecting incorrect memory values, and overwriting addresses containing the incorrect memory values with corrected memory values.

20. The method of claim 19, wherein the computer system is implemented using one or more field programmable gate arrays (FPGAs).

* * * * *